United States Patent
Raheli et al.

(10) Patent No.: US 6,389,079 B2
(45) Date of Patent: *May 14, 2002

(54) NON-COHERENT SEQUENCE ESTIMATION RECEIVER FOR DIGITAL MODULATIONS

(75) Inventors: Riccardo Raheli, Parma; Giulio Colavolpe, Amantea, both of (IT)

(73) Assignee: Siemens Information and Communications, Milan (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/437,668

(22) Filed: Nov. 10, 1999

Related U.S. Application Data

(63) Continuation of application No. PCT/EP98/03486, filed on Jun. 3, 1998.

(30) Foreign Application Priority Data

Jun. 6, 1997 (IT) .......................... MI97A1301

(51) Int. Cl.$^7$ ............................. H04L 5/12; H04L 27/06
(52) U.S. Cl. ....................................... 375/262; 375/341
(58) Field of Search ................................ 375/341, 340, 375/322, 324, 325, 329, 262, 260, 261; 371/43.7; 704/242

(56) References Cited

U.S. PATENT DOCUMENTS

| | | | |
|---|---|---|---|
| 4,885,757 A | * 12/1989 | Provence | ................... 375/343 |
| 5,689,532 A | * 11/1997 | Fitzpatrick | ................. 375/341 |
| 5,784,415 A | *  7/1998 | Chevillat et al. | ........... 375/341 |
| 5,933,462 A | *  8/1999 | Viterbi et al. | ............... 375/341 |
| 6,034,997 A | *  3/2000 | Mackenthun | ............... 375/265 |

OTHER PUBLICATIONS

D'Andrea A N et al, IEEE Transactions on Communications, vol. 42, No. 2/3/4, Feb. 1, 1994, pp. 1033–1039.
Raphaeli D, IEEE Transactions on Communications, vol. 44, No. 2, Feb. 1, 1996, pp. 172–183.
P.Y. Kam et al, IEEE Transactions on Communications, vol. 43, No. 9, Sep. 1995, pp. 2429–2433.
Raheli R et al, IEEE Transactions on Communications, vol. 43, No. 2/03/04, Feb. 2, 1995, pp. 354–360.
Colavolpe G et al, 1997 IEEE International Conference on Communications, Montreal, vol. 1, 8–12 Jun. 1997, pp. 21–25.
Colavolpe G et al, Proceedings of the 1997 IEEE International Symposium on Information Theory, ULM, Germany, Jun. 29, 1997–Jul. 4, 1997, p. 536.

(List continued on next page.)

Primary Examiner—Young T. Tse

(57) ABSTRACT

A non-coherent receiver for digitally modulated signals, linearly or not, possibly combined with channel coding, is described. In the case of M-PSK, or M-QAM modulations, the received signal is demodulated and filtered by a filter matched to the transmitted pulse. In the case of linear modulations in presence of intersymbol interference, and non-linear M-CPM modulations, the reception filter is of the whitened matched type. The signal is filtered and sampled and the samples are accumulated in a relevant memory containing N-1 samples preceding the current one. These samples are processed by a Viterbi processor estimating the sequence of transmitted symbols according to a maximum likelihood criteria. A first embodiment calculates suitable trellis branch metrics using an implicit estimation of the carrier phase in PSP mode (Per- Survivor-Processing). In a second embodiment, suitable trellis branch metrics are obtained from the expression of the maximum likelihood non-coherent sequence metric by proper truncation of their inherent memory to finite values.

25 Claims, 6 Drawing Sheets

OTHER PUBLICATIONS

M.K. Simon, S.M. Hinedi e W.C. Lindsey, "Digital communication techniques," pp. 461–466, published by Prentice Hall, Englewood Cliffs, 1995.

E. Biglieri, D. Divsalar, P.J. McLane and M.K. Simon, "Introduction to trellis–coded modulation with applications," pp. 295–303, published by Macmillan Publishing Company, 1991.

H. Leib et al., "The Phase of a Vector Perturbed by Gaussian Noise and Differentially Coherent Receivers," IEEE Transactions on Information Theory, vol. 34, No. 6, pp. 1491–1501, Nov. 1988.

F. Edbauer, "Bit Error Rate of Binary and Quaternary DPSK Signals with Multiple Differential Feedback Detection," IEEE Transactions on Communications, vol. 40, No. 3, pp. 457–460, Mar. 1992.

Stephen G. Wilson et al., "Multi–Symbol Detection of M–DPSK," Proceedings of IEEE GLOBECOME, pp. 1692–1697, Nov. 1989.

D. Divsalar et al., "Multiple–Symbol Differential Detection of MPSK," IEEE Transactions on Communications, vol. 38, No. 3, pp. 300–308, Mar. 1990.

H. Leib, "Noncoherent Block Demodulation of PSK," Proceedings of IEEE VTC, pp. 407–411, May 1990.

D. Divsalar et al., "The Performance of Trellis–Coded MDPSK with Multiple Symbol Detection," IEEE Transactions on Communications, vol. 38, No. 9, pp. 1391–1403, Sep. 1990.

D. Divsalar et al., "Maximum–Likelihood Differential Detection of Uncoded and Trellis Coded Amplitude Phase Modulation over AWGN and Fading Channels—Metrics and Performance," IEEE Transactions on Communications, vol. 42, No. 1, pp. 76–89, Jan. 1994.

D. Makrakis et al.,"Optimal Decoding of Coded PSK and QAM Signals in Correlated Fast Fading Channels and AWGN: A Combined Envelope, Multiple Differential and Coherent Detection Approach," IEEE Transactions on Communications, vol. 42, No. 1, pp. 63–75, Jan. 1994.

J. Proakis, "Digital Communications," McGraw–Hill, New York 1989, pp. 234–241.

M.V. Eyuboglu et al., "Reduced–State Sequence Estimation with Set Partitioning and Decision Feedback," IEEE Transactions on Communications, vol. 36, No. 1, pp. 13–20, Jan. 1988.

Pierre R. Chevillat et al., "Decoding of Trellis–Encoded Signals in the Presence of Intersymbol Interference and Noise," IEEE Transactions on Communications, vol. 37, No. 7, pp. 669–676, Jul 1989.

G. Ungerboeck, "Adaptive Maximum–Likelihood Receiver for Carrier–Modulated Data–Transmission Systems," IEEE Transactions on Communications, vol. COM–22, No. 5, pp. 624–635, May 1974.

G.D. Forney, Jr., "Maximum–Likelihood Sequence Estimation of Digital Sequences in the Presence of Intersymbol Interference," IEEE Transactions on Information Theory, vol. IT–18, No. 3, pp. 363–378, May 1972.

Pierre A. Laurent, "Exact and Approximate Construction of Digital Phase Modulations by Superposition of Amplitude Modulated Pulses (AMP)," IEEE Transactions on Communications, vol. COM–34, No. 2, pp. 150–160, Feb. 1986.

Umberto Mengali et al., "Decomposition of M–ary CPM Signals into PAM Waveforms," IEEE Transactions on Information Theory, vol. 41, No. 5, pp. 1265–1275, Sep. 1995.

Paul R. Motyka et al., "The Factorization of Discrete–Process Spectral Matrices," IEEE Transactions on Automatic Control, vol. AC–12, No. 6, pp. 698–707, Dec. 1967.

D.N. Prabhakar Murthy, "Factorization of Discrete–Process Spectral Matrices," IEEE Transactions on Information Theory, vol. 19, pp. 693–696, Sep. 1973.

* cited by examiner

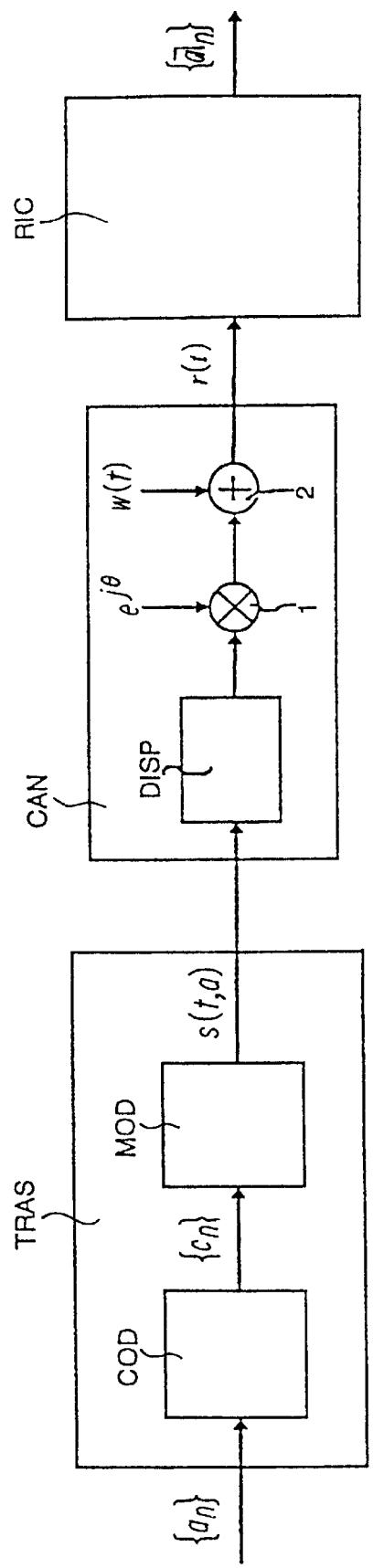
Fig. 1
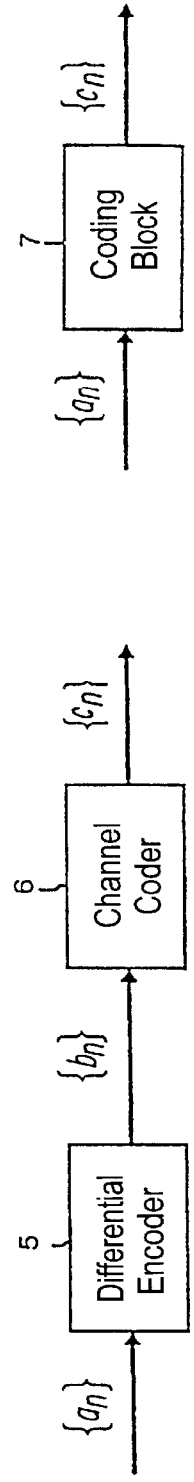
Fig. 7
Fig. 6

NON-COHERENT SEQUENCE ESTIMATION RECEIVER FOR DIGITAL MODULATIONS

This application is a Continuation of PCT International application No. PCT/EP98/03486 filed on Jun. 3, 1998, which deisgnated the United States and on which the priority is claimed under 35 U.S.C. § 120, the entire contents of which are hereby incorporated by reference.

FIELD OF THE INVENTION

The present invention relates to the field of digital modulated radio signals and more particularly to a method for the implementation of a non-coherent sequence estimation receiver for linear digital modulations.

BACKGROUND ART

In the relevant technical field, there are different classes of receivers. A first class of receivers is based on the structure of an optimum coherent receiver, that is, a receiver that minimizes the error probability on decided symbols when the synchronism is perfectly known, and in particular, the phase of the received signal, which will be dealt with hereafter. The implementation of such a receiver does not exhibit particular problems in a laboratory environment, where the modulation carrier is always available, but it cannot be followed up in practice when this receiver is placed in the field and the carrier is not available. In these cases, a preferred solution is to supply the receiver with a synchronization device enabling it to "recover" the information on the phase of the modulated carrier. The devices often used for this purpose are phase locked loops (Phase Locked Loop, or PLL). Such a receiver shall be hereinafter referred to as "pseudocoherent", since it is implemented according to the configuration of a coherent receiver to which a phase reference is supplied by a synchronization device. In these receivers, the phase is recovered but for multiples of $2\pi/n$, where n depends on the type of adopted modulation. As a consequence of the ambiguity in the phase introduced by the PLL, a differential encoding must be used in transmission, that is a coding where the information is not associated with the absolute phase of the modulation carrier, but to the phase difference between two consecutive symbols. As an alternative to the differential encoding it is possible to use pilot symbols during transmission, as described hereafter.

A second class of receivers consists of non-coherent receivers, that is those not requiring the information on the absolute phase of the transmitted signal. These receivers have different advantages compared to pseudocoherent receivers, namely:

1. they can be employed in situations where the synchronization recovery is difficult, such as for instance in the case of fading channels, or in presence of Doppler shift or frequency jumps due to the instability of oscillators;
2. they are simpler and cost effective since they have no PLL;
3. the synchronization state cannot be lost, contrarily to receivers with PLL where this loss can occur due to phase jumps, false locking or loss of the locking state;
4. after an out-of-duty interval caused by deep fading they are immediately operative, contrarily to receivers with PLL that require a transient period to recover the locking condition;
5. they can be employed in time division multiple access communication systems (Time Division Multiple Access, or TDMA), where coherent detection is not recommended due to the comparatively long acquisition time of the synchronism.

The first non-coherent receivers considered in technical literature were differential receivers, often employed in the detection of modulated phase digital signals, or PSK (Phase Shift Keying), where a differential coding ties the information to the phase difference between two consecutive PSK symbols. The receiver estimates this phase difference, not requiring therefore to be locked in phase with the received signal. A possible interpretation of the operation of these receivers is the following: with the differential coding process, the phase reference necessary for the data estimate is contained in the preceding symbol. Therefore it is not necessary to determine an absolute phase reference, since the preceding symbol can be used for this purpose. However, this involves a degradation of performance compared to a coherent receiver, due to the fact that in differential detection the phase reference is noisy, while in coherent detection this reference is perfectly known and therefore noise free. We could say that in the case of differential detection the signal to noise ratio (Signal-to-Noise Ratio, or SNR) of the reference signal is the same as the SNR of the information signal. In the case of a coherent receiver, on the contrary, the SNR of the reference signal is theoretically infinite. For instance, in the case of PSK modulations with two phase values only, or BPSK, (Binary PSK) the loss is small, that is 0.8 dB approximately at bit error rate, or BER, (Bit Error Rate) of $10^{-5}$. On the contrary, in the case of PSK modulations with M >2 phase values, or M-PSK, the performance loss can reach 3 dB. Starting from the above considerations, differential receivers have been conceived, drawing the phase reference from a given number of past symbols, in order to "filter" the noise effect. In this way the SNR of the phase reference is of higher quality and the performance approaches that of a coherent receiver. This type of receivers employing a so-called "decision feedback" are described, for instance in the following papers:

"The phase of a vector perturbed by Gaussian noise and differentially coherent receivers", authors: H. Leib, S. Pasupathy, published in IEEE Trans. Inform. Theory, vol. 34, pp.1491–1501, November 1988.

"Bit error rate of binary and quaternary DPSK signals with multiple differential feedback detection", author: F. Edbauer, published in IEEE Trans. Commun., vol. 40, pp. 457–460, March 1992.

They can be considered the forerunners of block differential receivers, or N-differential receivers, described below.

Block differential receivers fill the performance gap between coherent performance and simple differential ones, and are well described in the following papers:

"Multi-symbol detection of M-DPSK", authors: G. Wilson, J. Freebersyser and C. Marshall, published in the Proceedings of IEEE GLOBECOM, pp.1692–1697, November 1989;

"Multiple-symbol differential detection of MPSK", authors: D. Divsalar and M. K. Simon, published in IEEE Trans. Commun., vol. 38, pp.300–308, March 1990;

"Non-coherent block demodulation of PSK", authors: H. Leib, S. Pasupathy, published in the Proceedings of IEEE VTC, pp.407–411, May 1990;

and in the volume under the title "Digital communication techniques", authors: M. K. Simon, S. M. Hinedi and W. C. Lindsey, published by Prentice Hall, Englewood Cliffs, 1995, for the case of M-PSK modulations.

Block differential receivers, as well as those adopting decision feedback, are based on the idea of extending the observation interval on which decisions are based, compared to the observation interval of two symbols only, typical of simple differential receivers. For the latter, there is an additional peculiarity, which is deciding on multiple symbols at the same time, instead of symbol by symbol. N-differential receivers use an observation window of N symbols, and simultaneously make the decision on N-1 information symbols. This decision strategy can be seen as an extension of the decision strategy of differential receivers, which in fact correspond to case N=2. It has been demonstrated that in the case of M-PSK modulations, for $N \to +\infty$ the performance of this type of receiver tends to be like that of the coherent receiver. A number of examples of block differential receivers can be found in the literature, suitable to the different modulations; some of which are described in the papers mentioned above. In addition, we point out that:

M-PSK modulations with channel coding are described in the paper under the title "The performance of trellis-coded MDPSK with multiple symbol detection", authors: D. Divsalar, M. K. Simon and M. Shahshahani, published in IEEE Trans. Commun., vol. 38, pp.1391–1403, September 1990;

M-QAM coded and uncoded modulations (Quadrant Amplitude Modulation) are addressed in the paper "Maximum-likelihood differential detection of uncoded and trellis coded amplitude phase modulation over AWGN and fading channels metrics and performance", authors: D. Divsalar and M. K. Simon, published in IEEE Trans. Commun., vol. 42, pp.76–89, January 1994;

M-PSK and M-QAM modulations in fading channels, are treated in the previous article and in the article under the title "Optimal decoding of coded PSK and QAM signals in correlated fast fading channels and AWGN: a combined envelope, multiple differential and coherent detection approach", authors: D. Makrakis, P. T. Mathiopoulos and D. P. Bouras, published in IEEE Trans. Commun., vol. 42, pp.63–75, January 1994.

Some disadvantages, common to all the block differential or N-differential receivers, described in the extensive literature mentioned above, are caused by the type of strategy used in the decision, consisting of an exhaustive search made on the single data blocks. Therefore it is necessary to use small values of N, otherwise calculations would be exceedingly complicated even for small sizes of the input alphabet, practically impairing the realization of the receivers. To overcome this difficulty, those skilled in the art could think to estimate the transmitted sequence using the Viterbi algorithm, but would soon conclude that this way is not practicable since the metric can be made recurrent in none of the described receivers. In light of the above, some N-differential receivers are known, employing, though inappropriately, the Viterbi algorithm. In the case of M-PSK modulations, these receivers have been described in the following articles:

"Non-coherent coded modulation", author: D. Raphaeli, published in IEEE Trans. Commun., vol. 44, pp.172–183, February 1996;

"A Viterbi-type algorithm for efficient estimation of M-PSK sequences over the Gaussian channel with unknown carrier phase", authors: P. Y. Kam and P. Sinha, published in IEEE Trans. Commun., vol. 43, pp.2429–2433, September 1995.

Non-coherent receivers described by D. Raphaeli, representing the more pertinent known art, are based on maximally overlapped observations, that is extended to N-1 symbols preceding the present one, assumed as independent, even if they are not in reality, as the author clearly admits. We can also observe that the metrics used are identical to those heuristically assigned to the most recent symbols in the receivers described by P. Y. Kam and P. Sinha, where decisions are locally made, at each node of a trellis diagram. In this case there is no accumulation of metrics as, on the contrary, it occurs in the classical Viterbi algorithm. The interesting thing to be noticed in the receivers described by D. Raphaeli is that they reach a good operation performance, though inappropriately using the Viterbi algorithm. The approximation introduced, consists in recurrently having, the metrics of the previous N-differential block receivers for the sole purpose of employing the Viterbi algorithm, but without basing the assumptions on metrics and their use in the algorithm context, on effective and convincing theoretical postulates, justifying this recurrence relation. The performance of these receivers, while good, finds however a limit in the approximation introduced.

OBJECT OF THE INVENTION

Therefore an object of the present invention is to further improve the performance of known non-coherent receivers, at equal or reduced complexity level, at equal performance, and to indicate a non-coherent reception procedure of coded symbol sequences transmitted on a communication channel, affected by additive white gaussian noise, based on a more effective use of the Viterbi algorithm for the maximum likelihood estimation of the transmitted sequence. A receiver is also disclosed, performing the above mentioned procedure.

SUMMARY OF THE INVENTION

To attain these objects, an embodiment of the present invention is a non-coherent reception procedure of coded symbol sequences, obtained by amplitude and/or phase digital modulation of a carrier, transmitted on a communication channel, affected by additive white gaussian noise, based on the use of the Viterbi algorithm applied to a trellis sequence diagram, or trellis, where the branches represent all possible transitions among states defined by all possible subsequences of information symbols, possibly encoded, of finite length, through which algorithm paths are selected at each symbol interval on the trellis such that a path metric, cumulative of transition metrics, is maximum, the path metric being an indication of the likelihood level existing between the symbols of the path and a transmitted sequence of symbols, wherein each such transition metric is calculated through the following steps:

a) non-coherent base band conversion of the received signal, subsequent filtering of the converted signal through a filter matched to the basic pulse of the received signal, and sampling at symbol frequency of the filtered signal, obtaining a sequence of complex samples;

b) construction of a phase reference through accumulation of N-1 products among the complex sequential samples, conjugated, and corresponding code symbols, also complex, univocally associated with the relevant branch of the trellis; the number N-1 being finite length, selected in order to obtain the desired accuracy in the constructed phase, the accuracy increasing as N increases, at the expense of possible increase in the trellis complexity, expressed in terms of number of states;

c) normalization of the value of the phase reference, through division by its modulus;

d) replacement of a phase reference, or phasor, of the modulated carrier, present in the known analytical expression of the transition metrics used by an optimum coherent receiver, which could replace the non-coherent receiver whenever the phasor is known, with the phase reference constructed in the previous steps, obtaining an analytical expression for the calculation of each transition metric used by the non-coherent receiver.

In a second embodiment of the invention, the expression for calculating the trellis branch metrics is obtained from the known expression for maximum likelihood sequence estimation used by a non-coherent receiver. For this purpose, the function to maximize is interpreted as a general sequence metric, which can be obtained by recurrently updating a partial sequence metric defined at the n-th signal interval, the latter being in its turn possible to be calculated through accumulation of incremental metrics of unlimited memory. A truncation at N-1 symbols preceding the present one in the calculation of incremental metrics enables, without significant information loss, the construction of a trellis diagram to which the Viterbi algorithm can be applied for the search of the path with maximum metric, according to a known method.

A non-coherent receiver realized irrespectively of one or the other embodiments of the present invention is suitable to process both linear modulated signals, also affected by intersymbol interference, and CPM non-linear modulated ones, always giving better performance than conventional non-coherent receivers. A common inventive concept exists for the two embodiments of the invention, leading to obtain for linear modulations a common general diagram of the receiver, and in the case of M- PSK modulations, also the same analytical expressions of the branch metrics.

Like the conventional N-differential receivers, the receiver implemented according to the present invention contains a phase reconstruction memory, or a comparable one, whose length N can be selected in order to obtain a satisfactory compromise between complexity and performance. In fact, as N increases, the performance approaches that of the optimal coherent receiver (which perfectly knows the synchronism and can be implemented in practice only in an approximate way through a pseudocoherent receiver), but at the same time increases also the complexity expressed by the number of states of the trellis diagram. However, it is possible to obtain, with not too large values of N, a small complexity and nearly optimal performance. When the phase reconstruction memory of the subject receiver assumes a value equal to the length of a block in the N-differential receiver of the known art, or to the observation interval in the receiver described in the paper by D. Raphaeli of February 1996, the considered receiver exhibits better performance, because it employs an expression more effective of the branch metric, that is more compatible with the subsequent processing steps of the Viterbi algorithm and with the theoretical assumption on which the algorithm is based.

An additional aspect of the invention is a maximum likelihood sequence estimation receiver for code symbols.

Another aspect of the invention is a variant of the previous receiver valid when code symbols relate to a digital phase modulation, or M-PSK.

BRIEF DESCRIPTION OF THE DRAWINGS

Additional aspects and advantages of the present invention will become more clear from the following detailed description of an implementation and from the attached drawings given as a non-limiting example, where:

FIG. 1 shows an equivalent model in base band of a generic digital communication system including a receiver RIC implementing the process of the present invention;

FIGS. 6 and 7 represent two different implementations of the coding block COD of FIG. 1 for two different code typologies.

Referring to FIG. 1, a transmitter TRAS is connected to a receiver RIC through a communication channel CAN, that in the more general case dealt with in the present invention is considered linear, dispersive, and affected by additive white gaussian noise (Additive White Gaussian Noise, or AWGN), with power spectrum density $N_o/2$; in less general cases, the channel is considered as ideal. In the figure, the channel CAN is modelled by the cascade of a block DISP, of a multiplier 1, and an adder 2. The input of the transmitter TRAS is driven by rate 1/T, digital information symbols, belonging to an alphabet with cardinality M', assumed to be equiprobable and independent, forming a sequence $a=\{a_n\}$ reaching the input of a coder COD. Through some coding rule, the coder COD generates at its output a sequence of code symbols, $c=\{c_n\}$, in general complex and belonging to an alphabet with cardinality M≥M'. Notice that because the block diagram of FIG. 1 is a base band equivalent of the communication system, the signals appearing are actually complex envelopes. The code sequence $\{c_n\}$ reaches the input of a linear modulator MOD, mapping the sequence into a continuous time signal s(t, a). This signal shall depend of course on the sequence of information symbols briefly indicated by vector a. The transmission signal s(t, a) coming out from the modulator MOD crosses the transmission means used by the communication channel CAN and reaches a receiver RIC implemented according to the invention. It has at its input a received signal r(t), and provides at its output an estimate $\{\hat{a}_n\}$ of the transmitted information sequence $\{a_n\}$. During the transmission through the channel, the pulses of the signal s(t, a) undergo, in general, a distortion and a global phase rotation θ. The block DISP is equivalent to a filter, introduced in the diagram to account for the time dispersion underwent by the pulses, while the multiplier 1, to the second input of which a phasor $e^{j\theta}$ is applied, considers the above mentioned phase rotation. Finally, the adder 2 adds to the transmission signal output from the multiplier 1 the complex envelope w(t) of the noise present on the channel.

The received signal r(t) assumes the following expression:

$$r(t)=s'(t,a)e^{j\theta}+w(t) \tag{0.1}$$

where the phase rotation θ is assumed as constant for the entire transmission time and modelled as a random variable with uniform distribution in the interval [0,2π] and s'(t, a) denotes the response of filter DISP to signal s(t, a).

Figure 2:
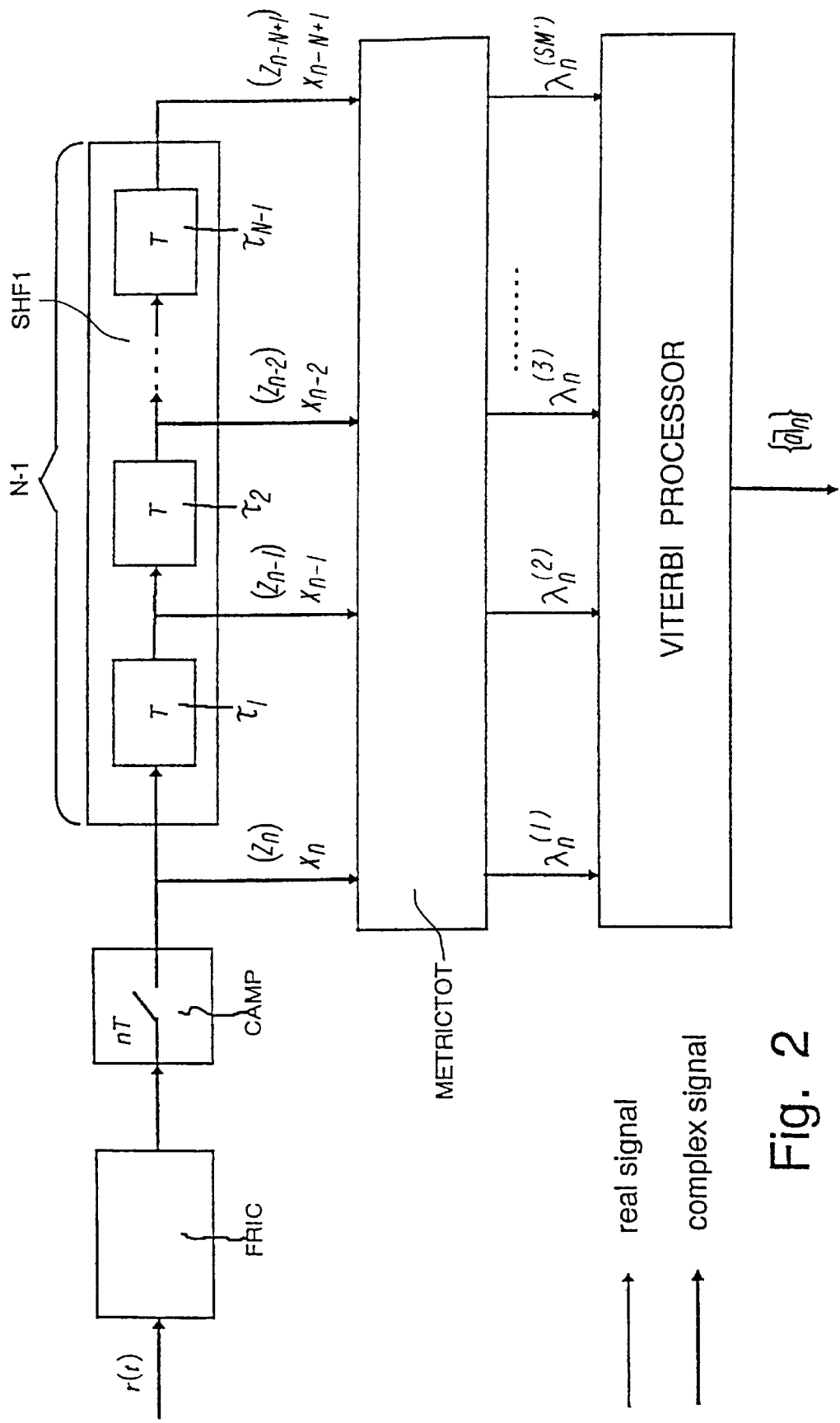
FIG. 2 shows a block diagram for describing the operation of the receiver RIC of FIG. 1 in the case of linear modulations.
Figure 8:
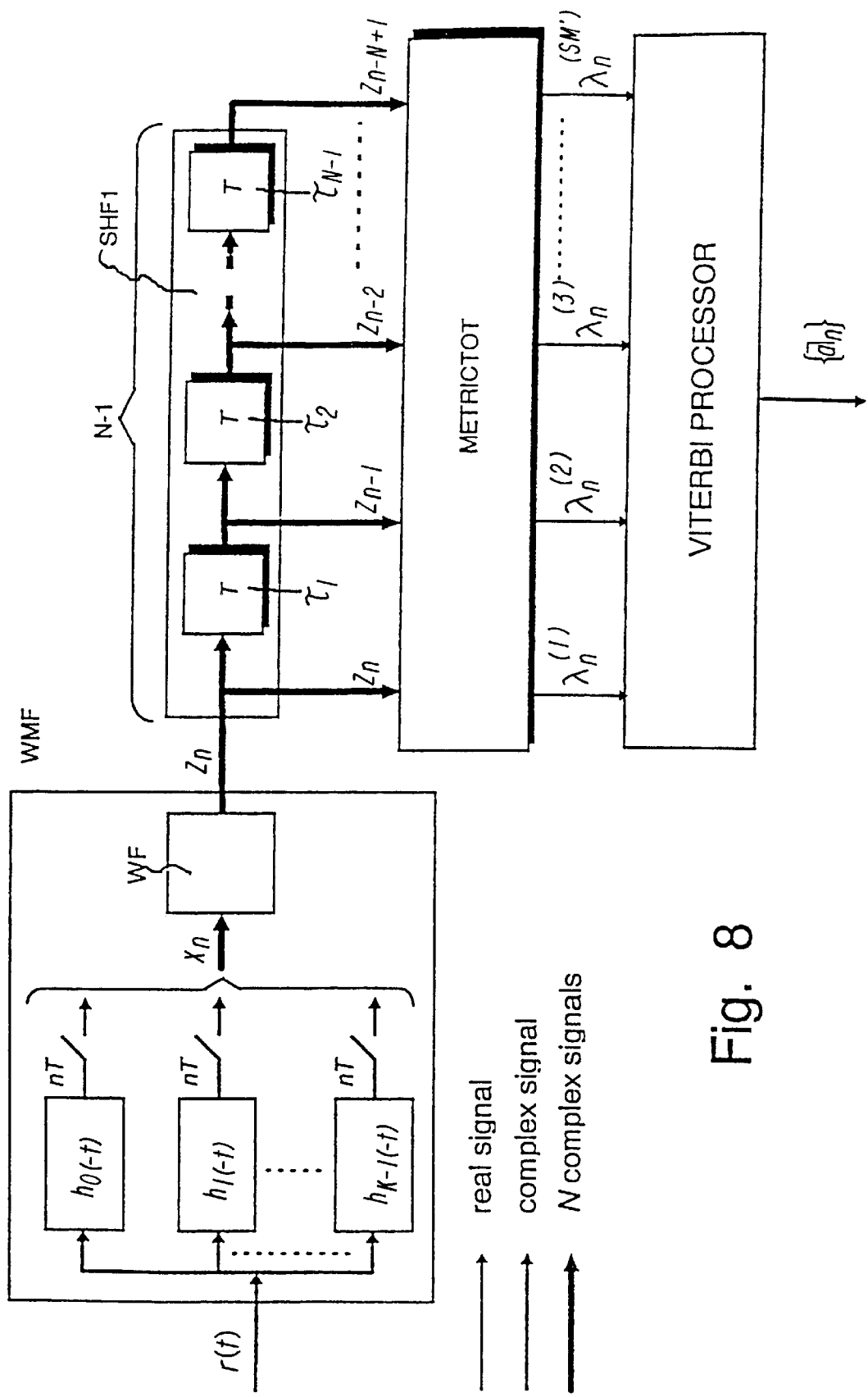
FIG. 8 shows a block diagram for describing the operation of the receiver RIC of FIG. 1, in case of non-linear modulations of the CPM (Continuous Phase Modulation) type.

The illustration of FIG. 1 is purposely generic, since its sole purpose is to introduce the basic elements of the channel preceeding the receiver RIC, where the invention actually resides. Sometimes, according to the particular receiver considered, the typologies of the blocks COD and MOD shall be specified, as well as the actual characteristics of the channel CAN. Without detriment to the general character of the invention, we shall describe a first embodiment of the receiver for linear modulations M-PSK and M-QAM transmitted on an ideal channel, that is without a block DISP. Afterwards, we shall depict a second embodiment of the receiver for linear modulations M-PSK and M-QAM transmitted on a channel alternatively considered as dispersive, and not, and finally for non-linear modulations of the CPM type. In both embodiments of the invention, the structure of the receiver RIC shown in FIG. 2 is valid, limited to linear modulations; of course, the content of some blocks will change. In the figure we have omitted the blocks not considered absolutely necessary to the understanding of the operation, known to those skilled in the art. FIG. 8 shows the structure of the receiver RIC valid for the CPM modulation, dealt with only for the second embodiment of the invention.

Making reference to FIG. 2, we shall now describe the receiver RIC valid for the first embodiment of the invention in the presence of linear modulations and a channel supposed as ideal. In this case the signal s(t, a) will assume the following expression:

$$s(t, a) = \sum_i c_i h(t - iT) \qquad (0.2)$$

where T is the symbol interval and h(t) is the transmitted pulse, properly normalized.

Assuming perfectly known symbol synchronism and carrier frequency, the signal r(t) can be expressed as follows:

$$r(t) = \sum_i c_i h(t - iT) e^{j\theta} + w(t) \qquad (1)$$

This signal reaches the input of a reception filter FRIC, after which a sampler CAMP is placed, yielding the samples $x_n$ with rate equal to the symbol frequency 1/T. The samples $x_n$ form a sequence $\{x_n\}$ sent to a line of N-1 delay elements $\tau_1$, $\tau_2, \ldots, \tau_{N-1}$ of a symbol interval T. These elements τ are the flip-flops of a shift register SHF1 storing a string of N-1 samples of the filtered signal for the duration of a symbol, making them available at the same time at the output of each single flip-flop τ. The sample $x_n$ and the N-1 preceding samples $x_{n-1}, x_{n-2}, \ldots, x_{n-N+1}$ are sent to a block METRICTOT performing, in correspondence, the calculation of appropriate expressions called "transition metrics", or "branch metrics", indicated in the figure by $\lambda_n^{(1)}, \lambda_n^{(2)}, \lambda_n^{(3)}, \ldots, \lambda_n^{(SM')}$. The branch metrics reach the inputs of a block called Viterbi Processor, known to those skilled in the art, giving at its output the estimated sequence $\{\hat{a}_n\}$. How this takes place in the presence of a signal r(t) given by (1) where symbols $c_i$ appear shall be explained describing some actual coding cases. Notice that in the figure, complex quantities are indicated with line arrows thicker than those used for real quantities.

The filter FRIC, matched to the real transmitted pulse h(t), known to the receiver, is a filter with impulse response h(-t). In general an impulse h(t) is used for which the pulse coming out from the matched filter satisfies the Nyquist condition for the absence of intersymbol interference, that is such that:

$$\int_{-\infty}^{\infty} h(t - iT)h(t - kT)dt = \begin{cases} 1 & \text{for } k = i \\ 0 & \text{otherwise} \end{cases} \qquad (2)$$

The selection of a filter FRIC with root raised-cosine frequency response, likewise the transmission filter FTRAS, involves an optimal filtering and the satisfaction of (2). Therefore samples $x_n$ can be expressed as:

$$x_n = r(t) \otimes h(-t)|_{t=nT} \qquad (3)$$

where the symbol $\otimes$ represents the convolution operator, and recalling (1) and (2):

$$x_n = c_n e^{j\theta} + \eta_n \qquad (3')$$

having indicated with:

$$\eta_n = \int_{-\infty}^{\infty} w(t) h(t - nT) dt \qquad (4)$$

the noise samples filtered by the filter FRIC. As in the case of known phase, the samples $x_n$ represent a sufficient statistic (that is their sequence includes the entire information associated with the corresponding continuous signal), and shall be indicated hereafter by the term "observable".

Concerning the operation of the receiver RIC of FIG. 2, it is only necessary to describe the nature of the block METRICTOT, since the implementation of the Viterbi Processor block is known to those skilled in the art, saying first that the algorithm there developed searches the path according to maximum accumulated metric on a sequential trellis diagram, also called a trellis, having S states, where M' branches start from each one of them, each one characterized by its own metric, representing the likelihood associated with the occurrence of the specific transition among subsequent states of the trellis.

Figure 3:
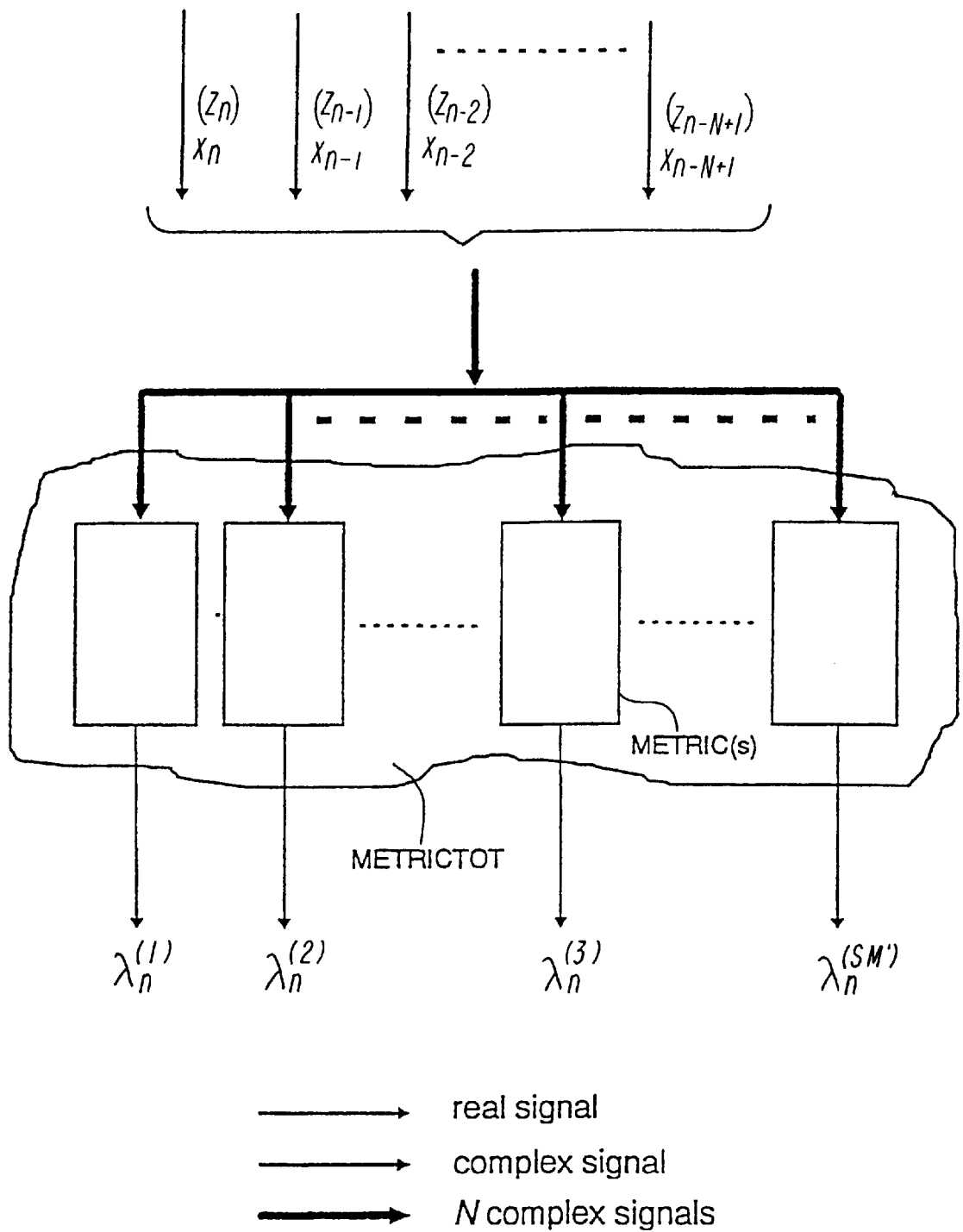
FIG. 3 shows a block diagram for describing the operation of the block METRICTOT of FIG. 2.

The structure of the block METRICTOT is better detailed in FIG. 3, where SM' identical blocks METRIC(s) with N inputs for samples $x_{n-1}, x_{n-2}, \ldots, X_{n-N+1}$ can be noticed and an output for a relevant branch metric $\lambda_n^{(s)}$. The single blocks METRIC(s) all work in parallel and differ only for the content of internal storage elements containing the code symbols $\tilde{c}_n, \tilde{c}_{n-1}, \ldots, \tilde{c}_{n-N+1}$ univocally associated with the particular branch of the trellis, of which the relevant block METRIC(s) calculated the metric $\lambda_n^{(s)}$.

In the non-coherent receiver RIC of the example not representing a restriction for the first embodiment of the invention, the analytical expression for the calculation of the metrics $\lambda_n^{(s)}$ is obtained starting from the analytical expression of the metrics calculated by the coherent receiver. This latter, assuming the ideal channel and the "optimal" global filtering, selects the code sequence that maximizes the sum of metrics having the following expression:

$$\text{Re}\{x_n \tilde{c}^*_n e^{-j\theta}\} - \tfrac{1}{2}|\tilde{c}_n|^2 \qquad (5)$$

where Re{.} indicates the real part of a complex number {.}; $\tilde{c}_n$ are code symbols univocally associated with the generic branch of the trellis at the discrete n-th instant, the asterisk * indicating the complex conjugate value of $\tilde{c}_n$; and θ is the known phase of the modulated carrier. The analytical derivation of (5) is shown in the volume under the title "Digital communications", author J. Proakis, published by McGraw-Hill, New York 1989.

In (5), the phasor $e^{-j\theta}$ is of course unknown to the non-coherent receiver RIC, however in the implementation of the receiver RIC according to the present invention (5) is used, replacing the phasor by its estimate based on the observation at the instant n, of N-1 samples preceding $x_n$, according to the relation:

$$e^{-\hat{j}\theta} = \frac{\sum_{i=1}^{N-1} x_{n-i}^* c_{n-i}}{\left|\sum_{i=1}^{N-1} x_{n-i}^* c_{n-i}\right|} \quad (6)$$

where the symbol $$e^{-\hat{j}\theta}$$

represents the estimate of the phasor, to obtain which, the N-1 samples $x_n$, differing from those bearing the same name in (5) due to the fact that they have been obtained through non-coherent base band conversion of the received signal, are stored for the purpose in a phase reconstruction memory represented by the shift register SHF1 of FIG. 2.

The estimator could replace the phasor $e^{-j\theta}$ in (5), whenever data $\tilde{c}_n, \tilde{c}_{n-1}, \ldots, \tilde{c}_{n-N+1}$ already "decided" by the Viterbi processor are known, while (6) contains data $c_n$, $c_{n-1}, \ldots, c_{n-N+1}$ transmitted and therefore not yet known. The estimate of these last is furnished by the Viterbi Processor with an inevitable delay, which would consequently involve at the n-th discrete instant an incorrect value of the phasor $e^{-j\theta}$, and therefore unusable in (5). To solve the problem of availability of the correct data sequence, a "Per-Survivor Processing", or PSP, technique can be used, described in the article "Per-survivor processing: a general approach to MLSE in uncertain environments", authors: R. Raheli, A. Polydoros and C. K. Tzou, published in IEEE Trans. Commun., vol. 43, pp.354–364, February/March/April 1995. Through this technique the Viterbi algorithm can be used in the presence of an unknown parameter, in this case the phase θ, which if known, could be advantageously used in the expression of the branch metric. The measure consists of using the above mentioned parameter in the expression of the branch metric, estimated according to a sequence of samples $x_{n-1}, \ldots, x_{n-N+1}$ of the signal $\tilde{r}(t)$, filtered by FRIC, and of a generic sequence of data $\tilde{c}_n, \tilde{c}_{n-1}, \ldots, \tilde{c}_{n-N+1}$.

Operating as above the following analytical expression is obtained for the calculation of branch metrics $\lambda_n$ of the receiver RIC:

$$\lambda_n = \frac{Re\left\{\sum_{i=1}^{N-1} x_n x_{n-i}^* \tilde{c}_n^* \tilde{c}_{n-i}\right\}}{\left|\sum_{i=1}^{N-1} x_{n-i}^* \tilde{c}_{n-i}\right|} - \frac{|\tilde{c}_n|^2}{2} \quad (7)$$

where $\tilde{c}_n, \tilde{c}_{n-1}, \ldots, \tilde{c}_{n-N+1}$ are the univocally coded symbols associated with the generic branch of the trellis at the n-th discrete instant, and $x_{n-1}, \ldots, x_{n-2}, \ldots, x_{n-N+1}$ are N sequential samples of the received signal, non-coherently converted to base band and optimally filtered. As can be noticed from (7), due to the estimate (6), the phase θ no longer explicitly appears in the expression of the metric. In a manner completely equivalent to the concepts described above, we can say that the estimate of the phase reference implemented in PSP mode is "aided by data", since for each survivor path at the instant n, the N-1 data relevant to its previous history is used. In the hypothesis not to discretionary reduce the number of states of the trellis, when transition metrics $\lambda_n^{(s)}$ are calculated at the instant n and the same are accumulated to select the survivors, the particular sequences $\tilde{c}_n, \tilde{c}_{n-1}, \ldots, \tilde{c}_{n-N+1}$ stored in the relevant blocks METRIC (s) of FIG. 3 used for the calculation of the metrics, correspond also to the N-1 data relevant to the previous history of those survivors. As a consequence of the above, the estimate (6) of phasor $e^{-j\theta}$ in PSP mode does not involve any variation in the traditional application of the Viterbi algorithm, thus justifying what above on full compatibility.

Of course the length N of the phase reconstruction memory is the result of a compromise between the need to make a more accurate estimate of the phasor present in (5), the accuracy increasing as N increases, and that to limit the expansion of the size of the trellis of the non-coherent receiver aspect of the invention, in respect with the trellis of the coherent receiver used as starting point for the calculation of the metrics, this latter being of course without phase reconstruction memory.

The equation (7), is the expression of a branch metric of the non-coherent receiver, which makes the calculation of path metric recurrent, perfectly compatible with the theoretical assumptions of the Viterbi algorithm, contrarily to what took place for the conventional non-coherent receivers. This new and original result was possible because we started from the expression (5) of the branch metric of the optimal coherent receiver, which is compatible with Viterbi, but inevitably inherits the ideal character distinguishing a similar receiver, and is not suitable at all for use in a non-coherent receiver like that of the invention. The modifications of this expression (5) made according to the instructions of the PSP technique have removed the ideal character from the metric expression (7) characterizing the present invention, while maintaining the actual operational compatibility features with the Viterbi algorithm and with the underlying theoretical justifications. It must be pointed out that expression (7) is not the result of a mere application of the known PSP technique, but a combination of different operational phases founded on using the optimal expression of the metric of the coherent receiver to obtain a similar expression valid for the non-coherent receiver. The inventors submit that nothing similar has been seen until now, nor could the present invention have been obvious to those skilled in the art, whose knowledge is well represented by the various papers mentioned herein. The assumption underlying the known expression of the branch metric (5), or of communication channel without intersymbol interference, is inevitably transferred to the expression of the branch metric (7), for the way it has been obtained. In practice, this situation occurs with good approximation in the channels made of low or medium capacity radio links, or in satellite connections. As can be also noticed from (7), the expression of the branch metric is absolutely general as for the type of coding, in fact, no rule has been specified up to now; in practice a commonly adopted coding is the differential one.

Figure 4:
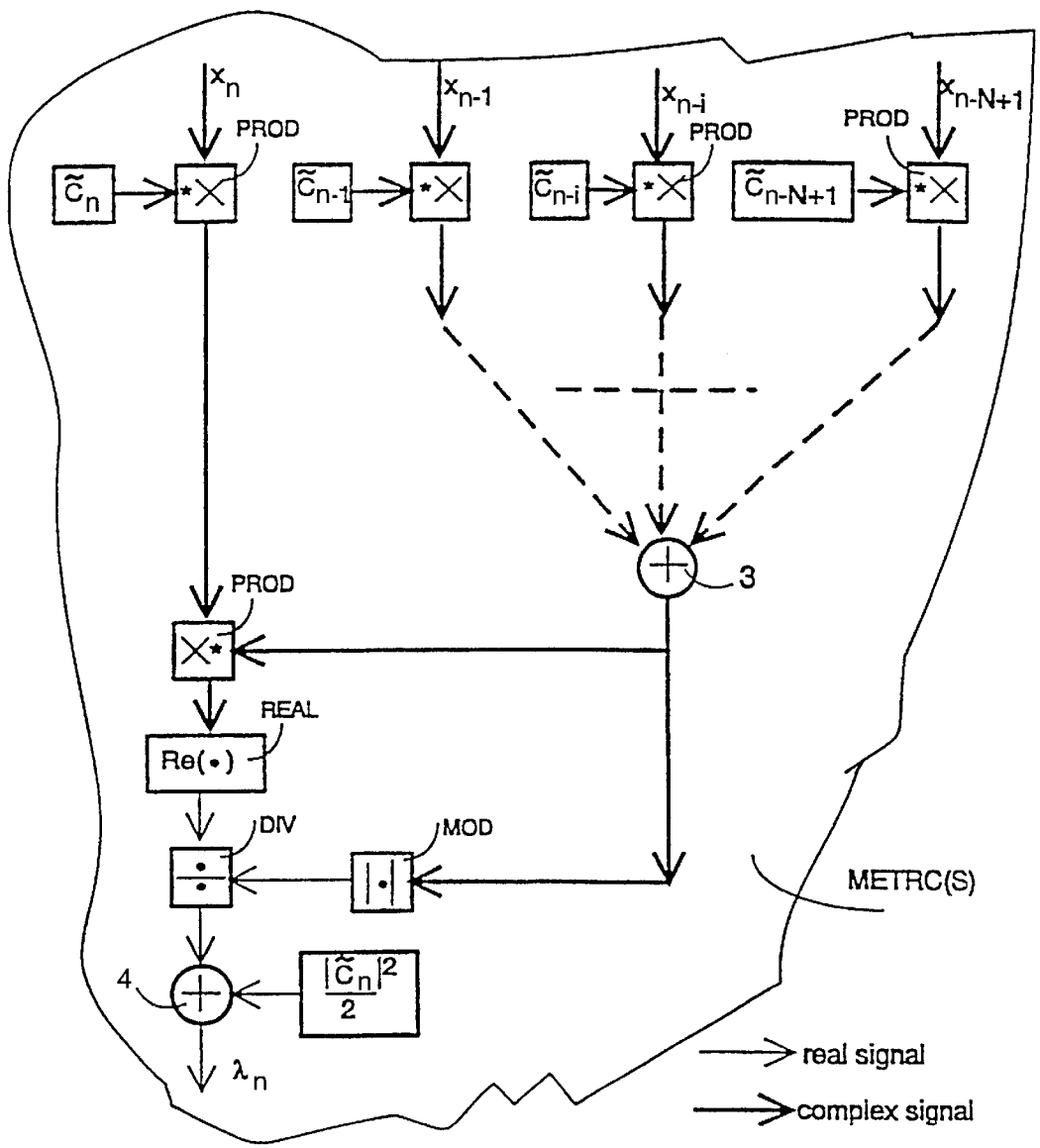
FIG. 4 shows a block diagram for describing the operation of a generic block METRIC(s) of FIG. 3.
Figure 4:
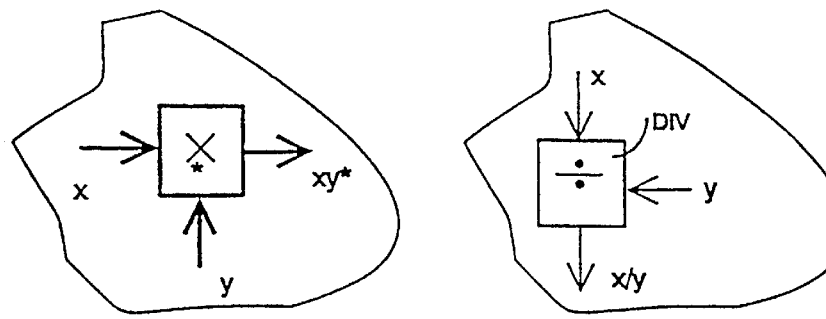

Making reference to FIG. 4, the structure of the generic block METRIC(s) of FIG. 3 is described in more detail, which calculates the branch metric $\lambda_n^{(s)}$ using the expression (7). For a better understanding of the shown diagram, arrows of different thickness are indicated in the figure, associated with real or complex quantities. The figure also shows at bottom the generic blocks PROD and DIV with the indication of the relevant operations accomplished. In particular the block PROD makes the product of the values at its inputs after having conjugated the value at the input marked with *, and the block DIV makes the quotient between the values at its inputs. As can be noticed, the generic samples $x_n$, $x_{n-1}, \ldots, x_{n-N+1}$ reach a first input of relevant multiplication blocks PROD, at the second input of which arrive the corresponding coded symbols $\tilde{c}_n, \tilde{c}_{n-1}, \ldots, \tilde{c}_{n-N+1}$ present in a memory of the block METRIC(s). Except for a first product $x_n \tilde{c}^*_n$, all the remaining products $x_{n-1}\tilde{c}_{n-1}$ are sent to a same number of inputs of an adder 3, whose outgoing sum is sent to a first input of an additional block PROD, at the second input of which arrives the first product $x_n \tilde{c}^*_n$. The product coming out from this last multiplier is sent to a block REAL that extracts the real part and sends it to a first input of a divider block DIV, at the second input of which arrives a value coming out from a block MOD. The input of the block MOD is reached by the sum coming out from the adder, of which the block MOD extracts the modulus and makes it available at output. The quotient coming out from the block DIV is sent to a first input of an adder 4, at the second input of which the value $$-\frac{|\tilde{c}_n|^2}{2}$$

arrives, obtained from the code symbol $\tilde{c}_n$ stored. The real value coming out from the adder 4 is the branch metric $\lambda_n^{(s)}$ calculated by the block METRIC(s).

It is now described the development of (7) through the configuration of the blocks of FIG. 4. First of all, the blocks PROD at top of the figure calculate the products $x_n\tilde{c}^*_n$ and $x_{n-1}\tilde{c}^*_{n-1}$ afterwards the adder 3 calculates the term $$\sum_{i=1}^{N-1} x_{n-i}\tilde{c}^*_{n-i}$$

of which the MOD block subsequently calculates the modulus. The modulus just calculated could also be used in (7) as divider, since the following relation is valid:

$$\left|\sum_{i=1}^{N-1} x_{n-i}\tilde{c}^*_{n-i}\right| = \left|\sum_{i=1}^{N-1} x^*_{n-i}\tilde{c}_{n-i}\right|.$$

The term $$\sum_{i=1}^{N-1} x_{n-i}\tilde{c}^*_{n-i}$$

is also conjugated and then multiplied by $x_n\tilde{c}^*_n$. From the product result, the real part is extracted, which divided by $$\left|\sum_{i=1}^{N-1} x^*_{n-i}\tilde{c}_{n-i}\right|$$

and summed to $$-\frac{|\tilde{c}_n|^2}{2},$$

forms the branch metric $\lambda_n^{(s)}$.

Concerning the particular coding of information symbols $\{a_n\}$ in code symbols $\{c_n\}$ the most general formulation has been described up to now. We shall now illustrate some applications of (7) in different coding conditions pertaining to the practical cases of larger use, highlighting additional inconveniences of the known art.

The cases examined in detail are the following:
A) Non-coherent sequence estimation receiver for signals with M-PSK modulation, transmitted together with pilot symbols as an alternative to differential encoding.
B) Non-coherent sequence estimation receiver for signals with M-PSK modulation and differential encoding (M-DPSK); the same receiver where the maximum likelihood sequence estimation takes place according to a simplified method is considered as a sub-case.
C) Non-coherent sequence estimation receiver for signals with M-PSK modulation and channel convolutional coding.
D) Non-coherent sequence estimation receiver for signals with M-QAM modulation and quadrant differential coding (M-DQAM).

Additional cases not specified, for instance the use of a TCM coding (Trellis Coded Modulation), can be easily drawn from the examples A), B), C), and D) that shall be now described.

In the introduction, we said that non-coherent receivers assume the use of a differential encoding during transmission, due to the practical difficulty in the recovery of an absolute phase recovery. However, this statement is not binding since, as it is known, as an alternative to the differential coding, the above mentioned recovery can be made through periodical introduction of one or more pilot symbols known to the receiver in the information symbol sequence transmitted every P of the symbols.

In the cases A), B) and C) the symbols $\{c_n\}$ belong to the M-PSK alphabet, therefore the generic transmitted symbol can be expressed as $c_n = e^{j\phi_n}$, where $$\phi_n \in \left\{\frac{2\pi m}{M}; m = 0, 1, \ldots, M-1\right\},$$

with M cardinality of the alphabet. In the above mentioned cases the branch metric (7) can be simplified. In fact, being $|c_n|=1$, it is possible to define the branch metrics as:

$$\lambda_n = \frac{Re\left\{\sum_{i=1}^{N-1} x_n x^*_{n-i}\tilde{c}^*_n\tilde{c}_{n-i}\right\}}{\left|\sum_{i=1}^{N-1} x^*_{n-i}\tilde{c}_{n-i}\right|} \quad (8)$$

since the term $$-\frac{1}{2}|\tilde{c}_m|^2$$

appears in the same way in all the branches of the trellis. It has also been verified that neglecting the denominator, an improvement of the performance of the receiver RIC is obtained, in this case (8) becomes:

$$\lambda_n = Re\left\{\sum_{i=1}^{N-1} x_n x^*_{n-i}\tilde{c}^*_n\tilde{c}_{n-i}\right\} \quad (9)$$

Using (9), the structure of the block METRIC(s) of FIG. 4 of course can be simplified, in fact it is possible to directly obtain the branch metric $\lambda_n^{(s)}$ at the output of the block REAL, thus eliminating the surplus blocks MOD, DIV, and the adder 4.

In the receiver of case A) symbols $c_n$ shall be intended as information symbols $a_n$ belonging to the M-PSK alphabet. The state of the trellis is defined as:

$$\sigma_n = (\tilde{c}_{n-1}, \tilde{c}_{n-2}, \ldots, \tilde{c}_{n-N+1}) \qquad (9')$$

and the number of states is $S=M^{N-1}$, and therefore it exponentially increases with the phase reconstruction memory. If at the instant n a pilot symbol is received, for instance $\chi$, the states compatible with it are all of the type:

$$\sigma_n = (\chi, \tilde{c}_{n-2}, \ldots, \tilde{c}_{n-N+1}) \qquad (9'')$$

that is only a fraction 1/M of total states. In this case the Viterbi processor maintains only a fraction of the survivor paths, namely, only the survivors leading to the states (9") compatible with the known pilot symbol. From the realization point of view, when the pilot symbol is received, the cumulative metrics of survivor paths that shall be eliminated, can be decreased of an appropriate quantity causing all the considered paths, generated by the survivors, to lose all the subsequent comparisons. In conclusion, the receiver of case A) exploits its advance knowledge, that is the fact that it knows that at a given instant that is k the symbol $c_n = \chi$ was not transmitted, to avoid having survivors ending in states not compatible with the known pilot symbol, and therefore reduce the probability of deciding for a wrong sequence.

The operation performance of a receiver implemented according to case A) of the present invention, with use of pilot symbols as an alternative to differential encoding, has been compared with that of an ideal coherent receiver which of course does not require pilot symbols. From the comparison, it resulted that for a phase reconstruction memory with N=4 and appropriate values of the cadence P of pilot symbols, the BER of the non-coherent receiver differs for up to 0.3 dB from that of the coherent receiver, for all the values considered of the signal-to-noise ratio.

Case B) is now examined, relevant to a non-coherent sequence estimation receiver for signals with M-PSK modulation and differential encoding (M-DPSK). Symbols $c_n$ are supposed to come, through a differential encoding $c_n = c_{n-1} a_n$, from a source of symbols $a_n$ equiprobable and independent, belonging to the M-PSK alphabet. Symbols $\tilde{c}_n$ in the expression of branch metrics (9) can be expressed as a function of the source symbols $\tilde{a}_n$ as follows:

$$\tilde{c}_n^* \tilde{c}_{n-i} = \prod_{m=0}^{i-1} \tilde{a}_{n-m}^* \qquad (10)$$

which introduced in (9) gives for $\lambda_n$:

$$\lambda_n = Re\left\{\sum_{i=1}^{N-1} x_n x_{n-i}^* \prod_{m=0}^{i-1} \tilde{a}_{n-m}^*\right\} \qquad (11)$$

From (11) it can be noticed how in the metric $\lambda_n$ the code symbols $\tilde{c}_n$ no longer appear, therefore it is the Viterbi processor itself that without any modification in its operation mode, accomplishes also the differential decoding, according to what is shown in FIG. 2. To obtain this, and as it results from (11), we see that the state $\sigma_n$ of the trellis used by the Viterbi processor must be defined on information symbols as:

$$\sigma_n = (\tilde{a}_{n-1}, \tilde{a}_{n-2}, \ldots, \tilde{a}_{n-N+2}) \qquad (12)$$

The number of states is $S=M^{N-2}$, whose exponential growth with N can be reasonably confined using small values of N, because we observed that a performance can however be obtained, expressed through the BER, very close to that of a coherent receiver for signals with differential encoding.

As sub-case B), a non-coherent receiver is described with expression of the branch metric (11), differing from the previous one due to the fact that the maximum likelihood sequence estimation takes place according to a simplified method. Techniques are known in the application field of this invention enabling reduction of the number of states of the trellis on which the Viterbi processor operates. Generally, once the length of the phase reconstruction memory is determined, a given number of information symbols will appear in the definition of state; now, using the above mentioned known complexity reduction techniques it is possible to define a reduced trellis where the state is defined in terms of a lower number of information symbols, for instance neglecting the more remote symbols, or making a partitioning of the symbol set (set partitioning). The above mentioned techniques are, for example, described in the following articles:

"Reduced-State Sequence Estimation (RSSE), with set partitioning and decision feedback", authors: M. V. Eyuboglu, S. U. H. Qureshi, published in IEEE Trans. Commun., vol. 36, pp.13–20, January 1988;

"Decoding of trellis-encoded signals in the presence of intersymbol interference and noise", authors: P.R. Chevillat and E. Eleftheriou, published in IEEE Trans. Commun., vol. 43, pp.354–364, July 1989.

The reduced complexity technique applied in the receiver of the present sub-case B) is of the RSSE type "reduced state sequence estimation". The "reduced" state is defined as $\sigma'_n = (\tilde{a}_{n-1}, \tilde{a}_{n-2}, \ldots, \tilde{a}_{n-Q+2})$, being the integer $Q \leq N$. In this way the number of states of the trellis diagram becomes $S=M^{Q-2}$. The remaining information symbols $a_{n-Q+1}, \ldots, a_{n-N+2}$ necessary for estimating of the phasor $e^{-j\theta}$ according to (6), not included, or not completely specified in the definition of reduced state, are found in PSP mode from the previous history of each survivor. A similar approach is described in section IV.A of the mentioned article by R. Raheli, A. Polydoros and C. K. Tzou, of February/March/April 1995.

This technique (PSP) of reduction of the number of states, can be applied also to the previous case A) and to the subsequent cases C) and D).

The performance of the non-coherent receiver of case B), and relevant sub-case have been evaluated for a 4-DPSK modulation (DQPSK, from Differential Quaternary PSK). Variable lengths of the phase reconstruction memory have been considered and therefore, different complexity levels of the trellis. The receiver according to the present invention has higher performance, at equal value of N, compared to the N-differential receiver described in the article by Divsalar and M. K. Simon of March 1990. For N=2 both the receivers degenerate in the classical differential receiver, so their performance coincides.

It has also been checked that the performance of the considered receiver tends, as N increases, to approach that of a coherent receiver of the DQPSK type, with a rate not depending on the signal-to-noise ratio. This demonstrates that not only asymptotically, for high signal-to-noise ratios, but in general for each value of this ratio, the performance of a coherent receiver can be approximated as desired, provided that a sufficiently high value of N is chosen. This is true also when the complexity is appropriately reduced. For instance, it results that with a non-excessive complexity (reduced to 16 states) the performance decrease is rather limited compared to the coherent receiver (0.2 dB at a BER of $10^{-4}$). Therefore the performance of the receiver of the present invention, in the application referred to as case B) is characterized by an insignificant loss compared to a coherent receiver, loss that in some applications can be lower than that due to an inaccurate estimation of the phase in the approximation of a coherent system through a pseudocoherent receiver.

Case C) is now examined, concerning that concerns a non-coherent sequence estimation receiver for signals with M-PSK modulation and channel convolutional coding. The following considerations are applicable to any type of channel coding, for instance to the TCM coding. For the purpose of better facilitating the description of the structure and the operation of the receiver relevant to case C), making reference to FIG. 5, a convolutional coder used in the transmitter TRAS of FIG. 1 for the case considered is first shown. The structure of the coder is that described in the paper by D. Raphaeli of February 1996 mentioned above. At the input of the coder shown in the figure, one can notice a sequence of information symbols $\{\delta_n\}$, with rate 1/T, belonging to an alphabet A={0, 1, ..., M-1}. The sequence $\{\delta_n\}$ is sent to a chain of K delay elements $\pi'_1, \pi'_2, \ldots, \pi'_2, \ldots, \pi'_N$ of a symbol interval T. These elements $\pi'$ are flip-flops of a shift register SHF2 storing a string of K symbols for the whole duration of the symbol, making them available at the same time at the output of each single flip-flop $\pi'$. Each sample $\delta_k$ coming out from a relevant flip-flop $\pi'$ simultaneously reaches a first input of $\eta$ multipliers $\Pi_{ij}$; at the second input of said multipliers arrive the relevant constants $g_{ij} \in A$. From the above, the total number of multipliers $\Pi_{ij}$ will result K$\eta$, organized in $\eta$ groups of K multipliers each. Indexes i and j placed as subscripts of elements $\Pi_{ij}$ and $g_{ij}$ indicate respectively the element i within the group of K elements, and a particular group j within the set of $\eta$ groups. The outputs of the K multipliers $\Pi_{ij}$, within each group j, reach the K inputs of a relevant adder $\Sigma_j$, modulo M. Each output of the $\eta$ adders $\Sigma_j$ reaches a relevant input of a selector SEL which, with rate equal to $\eta$ times the symbol frequency 1/T, cyclically outputs a sample at the selected input and sends it to a mapping block MAP. The samples coming out from the selector SEL form a sequence $\{\epsilon_{\eta k+l}\} \in A(l=0, 1, \ldots, \eta-1)$, which is mapped at the output by MAP in a corresponding complex sequence $\{c_{\eta k+l}\}$ of the M-PSK alphabet, as indicated in the figure by the different thickness of the arrows. The notation used herein foresees that the index k represents a time instant (discrete) synchronous with the information sequence and the index I defines each one of the $\eta$ code symbols associated with each information symbol.

Figure 5:
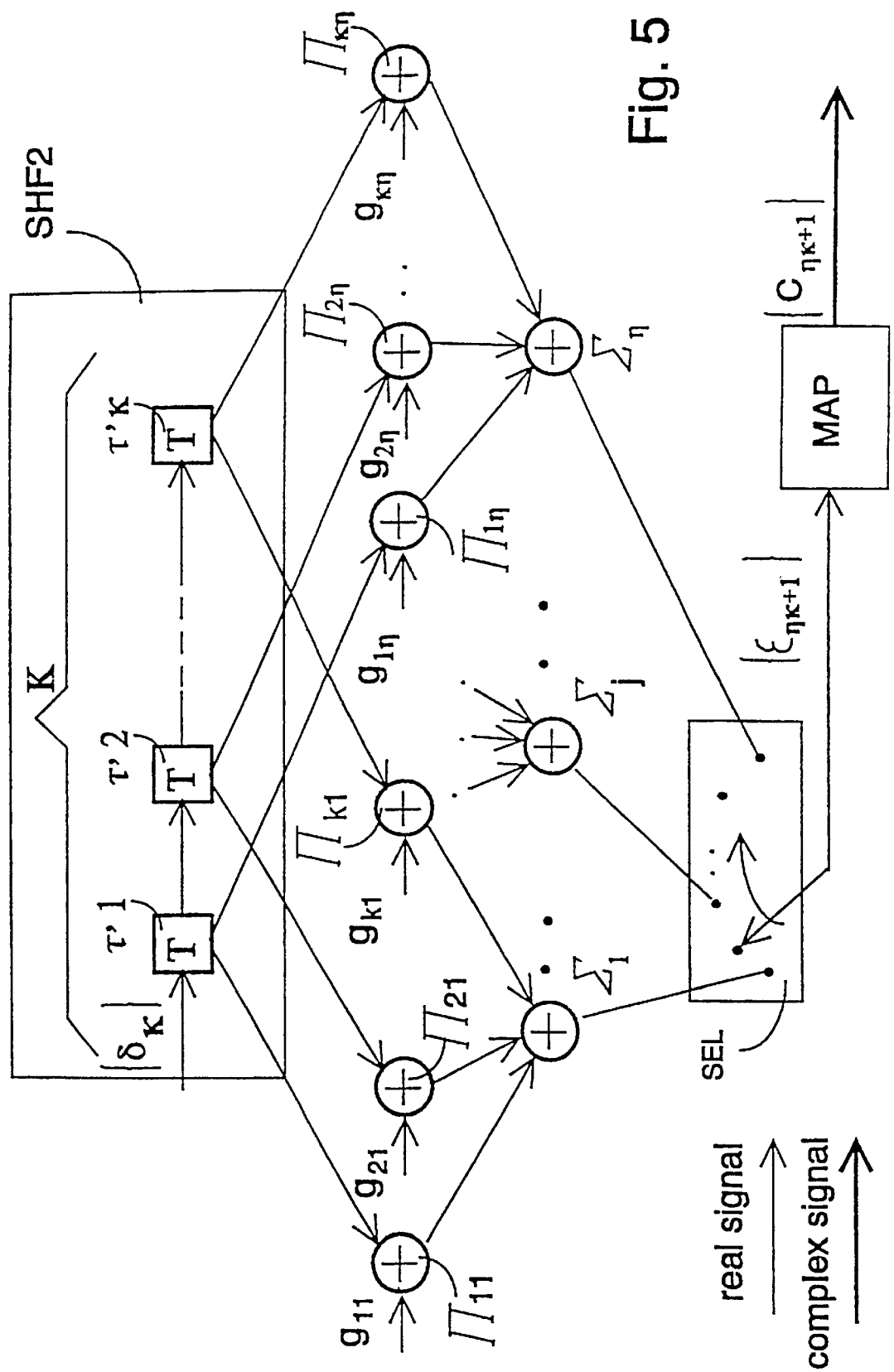
FIG. 5 shows the implementation of the coding block COD of FIG. 1, in case it represents a convolutional coder for multilevel symbols of the M-PSK type.

As for the operation of the coder in FIG. 5, the value K represents the constraint length of the code, which is characterized by a number of states equal to $S_c=M^{K-1}$. The constants $g_{ij} \in A$, are organized in $\eta$ K-tuple $g_1=(g_{11}, \ldots, g_{K1}) \ldots g_\eta=(G_{1\eta}, \ldots, g_{K\eta})$, and form the code generators, having rate 1/$\eta$. It is then possible to express the symbols $\epsilon_{\eta k+l}$ coming out from the selector SEL as follows:

$$\varepsilon_{\eta k+l} = \sum_{m=1}^{K} g_{ml} \delta_{k-m} \tag{13}$$

where the summation has to be intended "modulo M". The mapping operation is made by the block MAP through the following relation:

$$c_{\eta k+l} = e^{j\frac{2\pi}{M}\varepsilon_{\eta k+l}}.$$

It is possible to define a relation between symbols $c_{\eta k+l}$ and $a_n$ remembering that without the convolutional coding, the symbols $\delta_n$ should be mapped by the block MAP in symbols $a_n$ belonging to the M-PSK alphabet according to the relation:

$$a_n = e^{j\frac{2\pi}{M}\delta_k}.$$

With adequate manipulation of the previous expressions, we obtain:

$$c_{\eta n+l} = \prod_{m=1}^{K} a_{n-m}^{g_{ml}} \tag{14}$$

This assumed, the calculation of branch metrics concerning the receiver of the present case C) that employs the coder of FIG. 5, can be made starting from the expression (9) of the branch metric for the similar receiver M-PSK, without channel coding. In the case of the present convolutional coding, the index n in (9) can be replaced by $\eta n+j$, where the new index n scans the information symbols, while the index j scans the 1 code symbols associated with the n-th information symbol. Also, the Viterbi algorithm operates on information symbols and therefore the contribution to the branch metrics relevant to the $\eta$ code symbols corresponding to a given information symbol must be summed up. Consequently, the branch metrics (9) become:

$$\lambda_n = Re\left\{\sum_{i=1}^{L-1}\sum_{j=0}^{\eta-1}\sum_{l=0}^{\eta-1} x_{\eta n+j} x^*_{\eta(n-i)+l} \tilde{c}^*_{\eta n+j} \tilde{c}_{\eta(n-i)+l}\right\} \tag{15}$$

where L=N/$\eta$ is assumed as integer. Using (14) in (15) it is possible to express the code symbols as a function of the information symbols, obtaining:

$$\lambda_n = Re\left\{\sum_{i=1}^{L-1}\sum_{j=0}^{\eta-1}\sum_{l=0}^{\eta-1} x_{\eta n+j} x^*_{\eta(n-i)+l}\left(\prod_{m=1}^{K} a_{n-m}^{g_{mj}}\right)^* \prod_{k=1}^{K} \tilde{a}_{(n-i)-k}^{g_{kl}}\right\} \tag{16}$$

which is the expression of a branch metric for the receiver considered, whose trellis has a number of states $S=S_cM^{L-1}$, where $S_c=M^{K-1}$, and therefore $S=M^{L+K-2}$, having implicitly considered the case not requiring the introduction of a differential encoding before the channel coder: this statement shall be clarified hereafter. In the opposite instance the number of states is $S=S_cM^{L-2}$ due to reasons similar to those expressed in the calculation of the number of states of the receiver M-DPSK of case B). Since the trellis may become rather complex, the described complexity reduction techniques may be applied.

Making reference to FIGS. 6 and 7, we shall now describe some known subjects, concerning in general the channel codes expressed by the coder COD of FIG. 1; the purpose is to determine the advantages for the receivers according to the invention, by comparison with conventional ones.

Two blocks 5 and 6 placed in cascade are shown in FIG. 6, which represent a particular implementation of the coder COD included in the transmitter TRAS of FIG. 1. The block 5 represents a differential encoder, the input of which is reached by the sequence of information symbols a={$a_n$}, and a sequence of symbols b={$b_n$} coded in differential mode is supplied at its output. The block 6 is a channel coder expressing a phase rotationally invariant code of multiples of an angle φ driven by vector b representing the sequence at its input. At the output of block 6 the sequence c={$c_n$} is present. Both the coders are of the known type. For the coder 6 the following property applies, that is described in the volume under the title "Introduction to trellis-coded modulation with applications", authors: E. Biglieri, D. Divsalar, P. J. McLane and M. K. Simon, published by Macmillan Publishing Company, 1991: if the coded sequence c={$c_n$} corresponds to the sequence b={$b_k$} of symbols at the input of the channel coder, the sequence $ce^{jm\phi}$, with any m, is still a code sequence and corresponds to an input sequence $be^{jm\phi}$. This code behavior, lacking appropriate countermeasures, could be catastrophic for the receiver, since it would prevent the decoding of the information symbols. The countermeasures which make it possible to use a code of this type, consist in differentially encoding the information symbols before channel coding, as shown in FIG. 6. In this case the sequences b and $be^{jm\phi}$ that are not discriminated by the decoder, correspond to a same information sequence a ={$a_n$} through a differential coding, and the problem is thus solved. This enables us to see how the cascade of the two blocks 5 and 6 of FIG. 6 behaves as a unique coder globally non-invariant to rotations, corresponding to the unique block 7 of FIG. 7.

The implementation of the block COD of FIG. 1 according to the setting of FIG. 6 makes possible in the known art the use of a pseudocoherent receiver, which employs the metrics of the coherent receiver assuming as true the phase obtained making use of a PLL, because the reception is possible even if the PLL locks not on the true phase but on a phase differing from it by a multiple of the angle φ. In this case it is necessary to construct the trellis on the symbols {$b_n$}, except for the subsequent use of a differential decoder to obtain the decided symbols {$a_n$}. This double decoding passage can be avoided in the receivers of the subject invention. In fact, in the presence of a rotation invariant code preceded by differential coding, the trellis is constructed not on the symbols {$b_n$} but on information symbols {$a_n$}; in this way the Viterbi processor performs also differential decoding. If one wants to proceed in a different way and constructs the trellis on coded symbols $\tilde{c}_n$, the same path metric would be associated with the input sequences which differ for a constant phase rotation, due to the fact that products of the type $\tilde{c}^*_n \tilde{c}_{n-i}$ invariant to phase rotation appear in the branch metrics (7). Therefore, more maximum likelihood paths would be present on the trellis. Then, such a choice should be avoided.

An additional advantage of non-coherent receivers of the present invention, as compared to the known art consisting of pseudocoherent receivers with PLL, is a free use of a channel code non invariant to phase rotations. In fact, as for the particular known art considered, we have just seen that the coder structure shown in FIG. 6 results binding, where the channel code is rotationally invariant. On the other hand, a channel code non invariant to phase rotation (differently obtained from the cascade of blocks of FIG. 6) would not enable the pseudocoherent receiver to neutralize the phase ambiguity introduced by the PLL. To overcome this serious disadvantage, the known solutions consist in giving an absolute phase reference to the receiver, for instance, using the pilot symbols mentioned above during transmission.

Concerning the non-coherent receiver of the present invention, a constant phase rotation of the carrier of any angle θ∈[0,2] has no effect, considering that in the metrics of the receiver expressed in (7) appear products of the type $x_n x^*_{n-i}$ which are invariant to the rotation θ. Therefore, also a code non invariant to rotation can be used according to the diagram of FIG. 7, without the need for pilot symbols. However, this advantage is not exclusive to the receiver according to the present invention, but is true for all non-coherent receivers.

The performance of the non-coherent receiver of the present case C) has been compared with that of the receiver described in the article by D. Raphaeli of February 1996 mentioned above. The parameters selected to characterise both the receivers, foresaw the use of signals with QPSK modulation and convolutional non rotationally invariant coding, with K=3 and η=2 (and therefore $S_c$=16). The code generators used for this purpose were: $g_1$=(1, 3, 3) and $g_2$=(2, 3, 1). A phase reconstruction memory has been used in the receiver with L=4. From the comparison it resulted that the receiver of the present case C) gains 0.3 dB in performance at given BER, for any value considered of the signal-to-noise ratio, compared to the receiver of the known art, and loses only 0.2 dB compared to the optimal coherent receiver.

Finally, we describe case D), relevant to a non-coherent sequence estimation receiver for signals with M-QAM modulation and differential coding (M-DQAM). For the following subjects, reference to FIGS. 1, 2, 3 and 4, still applies together with notions introduced describing case B) relevant to a non-coherent sequence estimation receiver for signals with M-PSK modulation and differential coding (M-DPSK).

Concerning the receiver of the present case D), the symbols $c_n$ belonging to the M-QAM alphabet are assumed to be derived from information symbols $a_n$, of the same alphabet, equiprobable and independent, through a quadrant differential coding. A symbol belonging to the M-QAM set can be expressed as follows:

$$a_n = \mu_n p_n \quad (17)$$

here $\mu_n$ is the symbol $a_n$ multiplied by a phasor multiple of π/2 which brings it in the first quadrant of the complex plane, and $p_n$ belongs to the set QPSK {±1, ±j}; $p_n$ represents just the inverse of the subject phasor. The quadrant differential encoding produces a coded symbol:

$$c_n = \mu_n q_n \quad (18)$$

with:

$$q_n = p_n q_{n-1} \quad (19)$$

which is the usual differential coding for M-PSK modulations applied to symbols $p_n$ of a constellation QPSK. Branch metrics defined by the more general expression (7) can be expressed depending on information symbols $a_n$ in order that the Viterbi processor implements also quadrant differential decoding. In particular, for (17), (18) and (19) we have:

$$\tilde{c}^*_n \tilde{c}_{n-i} = \tilde{\mu}^*_n \tilde{\mu}_{n-i} \tilde{q}^*_n \tilde{q}_{n-i} = \tilde{\mu}^*_n \tilde{\mu}_{n-i} \prod_{m=0}^{i-1} \tilde{p}^*_{n-m} = \tilde{a}^*_n \tilde{\mu}_{n-1} \prod_{m=1}^{i-1} \tilde{p}^*_{n-m} \quad (20)$$

Multiplying the term $$\left|\sum_{i=1}^{N-1} x_{n-i}^* \tilde{c}_{n-i}\right| \text{ by } |\tilde{q}_n^*| = 1$$

and considering that:

$$\tilde{q}_n^* \tilde{c}_{n-i} = \tilde{\mu}_{n-i} \tilde{q}_{n-i} \tilde{q}_n^* = \tilde{\mu}_{n-i} \tilde{p}_n^* \sum_{m=1}^{i-1} \tilde{p}_{n-m}^* \quad (21)$$

and also that $|\tilde{c}_n|=|\tilde{a}_n|=|\mu_n|$ we obtain from (7):

$$\lambda_n = \frac{Re\left\{\sum_{i=1}^{N-1} x_n x_{n-i}^* \tilde{a}_n^* \tilde{\mu}_{n-i} \prod_{m=1}^{i-1} \tilde{p}_{n-m}^*\right\}}{\left|\sum_{i=1}^{N-1} x_{n-i}^* \tilde{\mu}_{n-i} \tilde{p}_n^* \prod_{m=1}^{i-1} \tilde{p}_{n-m}^*\right|} - \frac{|\tilde{a}_n|^2}{2} \quad (22)$$

Therefore a trellis diagram can be defined with state:

$$\sigma_n = (\tilde{\mu}_{n-1}, \tilde{\mu}_{n-2}, \ldots, \tilde{\mu}_{n-N+1}, \tilde{p}_{n-1}, \tilde{p}_{n-2}, \ldots, \tilde{p}_{n-N+2}) \quad (23)$$

$$= (\tilde{a}_{n-1}, \tilde{a}_{n-2}, \ldots, \tilde{a}_{n-N+2}, \tilde{\mu}_{n-N+1})$$

and the number of states results $S=M^{N-1}/4$.

The performance of the non-coherent M-DQAM receiver of the present case D) has been compared with that of the receiver described in the paper by D. Divsalar and M. K. Simon of January 1994, mentioned above. The results of this comparison showed that the performance of the receiver of the invention is characterized by a BER lower than that of the mentioned known art for any considered value of the signal-to-noise ratio, approaching the performance of the optimal coherent receiver with quadrant differential coding.

The second embodiment of the present invention is now considered, beginning with a first case where the received signal is characterized by linear modulations and absence of intersymbol interference. In this first case, the filter FRIC (FIG. 2) is then matched to the transmitted pulse h(t), assumed to be known, as it was up to now. For the following description it is convenient to better detail (0.2) as follows:

$$s(t, a) = \sum_{n=0}^{N_T-1} c_n h(t-nT) \quad (0.3)$$

where $N_T$ indicates the total number of code symbols transmitted.

In the non-coherent receiver RIC of the non limiting example, referred to the second embodiment of the invention, the analytical expression for the calculation of metrics $\lambda_n$ is obtained in a new way starting from the following known analytical expression of the maximum likelihood estimate of the transmitted sequence $\hat{a}$ by the non-coherent receiver:

$$\hat{a} = \arg\max_{\tilde{a}}\left\{-\frac{1}{2N_0}\int_{T_0} |s(t, \tilde{a})|^2 dt + \log I_0\left(\frac{1}{N_0}\left|\int_{T_0} r(t)s^*(t, \tilde{a})dt\right|\right)\right\} \quad (24)$$

where $I_0(x)$ is the modified Bessel function of the first type and of order zero, $T_0$ is the observation interval, $N_0$ is the noise one-side power spectral density, and $\tilde{a}$ is a generic sequence of information symbols.

Such an expression for the estimation sequence $\hat{a}$ is described, for instance, in Appendix 4C of the volume "DIGITAL COMMUNICATIONS", author J. Proakis, published by McGraw-Hill, New York, 2nd ed., 1989.

In the considered case of linear modulations it is necessary to replace (0.3) in (24) and assume an observation interval $T_0$ long enough, afterwards, with simple algebraic manipulations (24) becomes:

$$\hat{a} = \arg\max_{\tilde{a}}\left\{-\frac{1}{2N_0}\sum_{n=0}^{N_T-1}|\tilde{c}_n|^2 + \log I_0\left(\frac{1}{N_0}\left|\sum_{n=0}^{N_T-1} x_n \tilde{c}_n^*\right|\right)\right\} \quad (25)$$

where $\{\tilde{c}_n\}$ is the code sequence univocally associated with the hypothetical sequence of information symbols $\tilde{a}$ according to the specified coding rule, and $x_n$ is the output sampled at instant t=nT of a matched filter, as defined in (3).

The equation (25) can be approximated assuming log $I_0(x)=x$; the quality of the approximation being better, for given $N_0$, for large values of $N_T$.

More generally, let us first consider the modulations where the pulses of the modulated signal have different energy, like in the case M-QAM, and define, starting from (25) a general sequence metric like:

$$\Lambda_{N_T}(\tilde{a}) = -\frac{1}{2}\sum_{n=0}^{N_T-1}|\tilde{c}_n|^2 + \left(\left|\sum_{n=0}^{N_T-1} x_n \tilde{c}_n^*\right|\right) \quad (26)$$

which can be obtained through recurrent updating of a partial sequence metric defined at the n-th signalling interval like:

$$\Lambda_n(\tilde{a}) = -\frac{1}{2}\sum_{k=0}^{n-1}|\tilde{c}_k|^2 + \left(\left|\sum_{k=0}^{n-1} x_k \tilde{c}_k^*\right|\right) \quad (27)$$

equation (27) being in turn possible to be obtained as accumulation of incremental metrics $\Delta_n(\tilde{a})$:

$$\Lambda_n(\tilde{a}) = \sum_{k=-n}^{n} \Delta_k(\tilde{a}) \quad (28)$$

The incremental metric $\Delta_n(\tilde{a})$ can therefore be calculated from (27):

$$\Delta_n(\tilde{a}) = \Lambda_{n+1}(\tilde{a}) - \Lambda_n(\tilde{a}) = \left|\sum_{k=0}^{n} x_k \tilde{c}_k^*\right| - \left|\sum_{k=0}^{n-1} x_k \tilde{c}_k^*\right| - \frac{1}{2}|\tilde{c}_n|^2. \quad (29)$$

The difficulty in the calculation of the incremental metric (29) is a consequence of its non-limited memory. The metric depends in fact on the entire previous code sequence, and the maximization of the general sequence metric would necessarily involve a search on a properly defined tree diagram. This search is reasonably feasible only when the length of the transmitted sequence consists of a few symbols, otherwise the exponential growth of the number of tree branches at each new transmitted symbol would quickly render this search unfeasible. In the second embodiment of the present invention, the inconvenience just highlighted is avoided through a suitable limitation of the memory of the incremental metric which, at the expense of a neglectable information loss, enables to maximize the general sequence metric performing a search on a trellis diagram rather than on a tree diagram.

The resulting advantage is significant since in the case of search on a trellis the number of branches remains constant at each symbol interval, contrarily to what happens on a tree, then the known Viterbi algorithm is well applicable.

To limit the memory of the incremental metric, a truncation is introduced in (29) such that only the N most recent observables $x_k$ and the corresponding code symbols $\tilde{c}_k$ are considered, being N<<$N_T$. After an initial transient period, that is, for n≥N-1, the resulting branch metrics, obtained from the expression (29) through memory truncation, will be:

$$\lambda_n = \left| \sum_{i=0}^{N-1} x_{n-i} \tilde{c}_{n-i}^* \right| - \left| \sum_{i=1}^{N-1} x_{n-i} \tilde{c}_{n-i}^* \right| - \frac{1}{2} |\tilde{c}_n|^2. \tag{30}$$

As in the case of the first embodiment of the invention, it is necessary to provide the receiver with a memory of N positions for an equal number of samples $x_n$, the above mentioned memory corresponds to the shift register SHF1 of FIG. 2, representing an element of conceptual continuity between the two embodiments. As can also be noticed, the expression of the branch metric in both the embodiments includes a sum of products among the stored N observables and of the corresponding code symbols associated with the transitions on the trellis.

Notice that the approximation $\log I_0(x)=x$ could be avoided, In this case the following branch metrics would be obtained:

$$\lambda_n' = \log I_0 \left( \frac{1}{N_0} \left| \sum_{i=0}^{N-1} x_{n-i} \tilde{c}_{n-i}^* \right| \right) - \log I_0 \left( \frac{1}{N_0} \left| \sum_{i=1}^{N-1} x_{n-i} \tilde{c}_{n-i}^* \right| \right) - \frac{1}{2N_0} |\tilde{c}_n|^2 \tag{31}$$

which of course depend on the signal-to-noise ratio. Even if the approximation $\log I_0(x)=x$ is not used in these metrics, the receivers based on them do not necessarily give a performance better than that of the receivers based on metrics (30). In fact the effect of the truncation on the most recent symbols can be different in the two cases. It has been verified that the receivers based on the metrics (31) have performance equivalent to that of the receivers based on metrics (30) in all the cases considered below.

An additional element of conceptual continuity with the first embodiment is obtained considering the modulations where the pulses of the modulated signal have equal energy, as occurs in M-PSK modulations; in this case the following description will lead to branch metrics with just the same expression (9) previously obtained from the first embodiment, concerning the similar case. Reconsidering for this purpose (25) we see that the approximation $\log I_0(x)=x$ is no longer necessary since the first term can be omitted, being constant for all the sequences, and the function $\log I_0(x)$ is monotonically increasing for x≥0. Therefore, the general sequence metric becomes:

$$\hat{a} = \arg \max_{\tilde{a}} \left| \sum_{n=0}^{N_T-1} x_n \tilde{c}_n^* \right| \tag{32}$$

and the relevant expression of the branch metric can be obtained operating as in the derivation of (30), with the difference that now the last term will be absent and the sole approximation in the calculation shall be due to the truncation.. Considering the fact that the function $y=x^2$ is monotonically increasing for x≥0, a general sequence metric equivalent to (32) is:

$$\left| \sum_{n=0}^{N_T-1} x_n \tilde{c}_n^* \right|^2 = \sum_{n=0}^{N_T-1} \sum_{m=0}^{N_T-1} x_n x_m^* \tilde{c}_n^* \tilde{c}_m \tag{33}$$

$$= \sum_{n=0}^{N_T-1} |x_n|^2 |\tilde{c}_n|^2 + 2Re \left\{ \sum_{n=1}^{N_T-1} x_n \tilde{c}_n^* \sum_{m=0}^{n-1} x_m^* \tilde{c}_m \right\}.$$

In this expression the general sequence metric is given by the sum of all the elements of a $N_T \times N_T$ Hermitian matrix The first summation appearing in (33) is independent of the code sequence, being $|\tilde{c}_n|^2=1$. Therefore an equivalent simplified expression of the metric (33) is:

$$\Lambda_{N_T}(\tilde{a}) = Re \left\{ \sum_{n=0}^{N_T-1} x_n \tilde{c}_n^* \sum_{m=0}^{n-1} x_m^* \tilde{c}_m \right\} \tag{34}$$

Operating on (34) through a procedure similar to the one that led to (30), we can define, for n≥N-1, the expression of a truncated incremental metric, which can be used to calculate the following branch metrics:

$$\lambda_n = Re \left\{ x_n \tilde{c}_n^* \sum_{m=n-N+1}^{n-1} x_m^* \tilde{c}_m \right\} = Re \left\{ \sum_{i=1}^{N-1} x_n x_{n-i}^* \tilde{c}_n^* \tilde{c}_{n-i}^* \right\} \tag{35}$$

which is equivalent to the expression (9) above. The equations (30) and (35) enable the maximization of the general sequence metric recurrently operating through the Viterbi algorithm on a trellis whose branch metrics are given by (30) or its simplification (35) equivalent to (9). As already highlighted, for a given coding rule, the code symbols $\{c_n\}$ can be expressed according to the information symbols $\{a_n\}$ and the trellis state can be defined accordingly, thus avoiding the additional decoding. The equations (30) and (35) depend on N code symbols, in general, the number of states of the trellis is higher than the number of states of the code trellis. However, this complexity increase can be limited by means of appropriate complexity reduction techniques, as the already mentioned ones, in order to limit the number of states without excessively reduce the value of N. In practice, it is possible to obtain a performance very close to that of ideal coherent detection (that is in the case when phase θ is perfectly known), though using values of N of some units. This is a clear demonstration of the scarce significance of the loss of information due to the truncation at N symbols of the memory length for the calculation of the branch metrics. A possible explanation of the obtained results is that the main information for the purposes of sequence estimation is concentrated in the most recent symbols.

Concerning the receiver used in the second embodiment of the present invention, within the limits of what has been described up to now, the illustration of the receiver RIC of FIG. 2 and the block METRICTOT of FIG. 3 still applies with the warning that the internal structure of the generic block forming METRIC(s) of FIG. 3, will change to match the expression of the branch metric (30), while it will remain identical in the case (35) is used. From the previous description of the internal structure of the block METRIC(s) of FIG. 4, and from the nature of the new expression (35), those skilled in the art could obtain the teaching to implement a block METRIC(s) suitable for the calculation of such an expression.

Remaining in the context of linearly modulated signals free from intersymbol interference, the cases A), B), C) and D) previously described are now examined and summarized below:

A) Non-coherent sequence estimation receiver for signals with M-PSK modulation, transmitted together with pilot symbols as an alternative to differential encoding.
B) Non-coherent sequence estimation receiver for signals with M-PSK modulation and differential encoding (M-DPSK).
C) Non-coherent sequence estimation receiver for signals with M-PSK modulation and channel convolutional coding.
D) Non-coherent sequence estimation receiver for signals with M-QAM modulation and quadrant differential encoding (M-DQAM).

Concerning case A), the considerations and the results of the first embodiment apply without any modification.

In case B), symbols $\{c_n\}$ are derived from information symbols $\{a_n\}$, belonging to the same alphabet, through the differential encoding rule $c_n = c_{n-1} a_n$. Applying such a coding the branch metric (30) becomes:

$$\lambda_n = \left| \sum_{i=0}^{N-1} x_{n-i} \prod_{m=0}^{i-1} \tilde{a}_{n-m}^* \right| - \left| \sum_{i=1}^{N-1} x_{n-i} \prod_{m=0}^{i-1} \tilde{a}_{n-m}^* \right| \qquad (36)$$

having expressed the coded symbols $\{c_n\}$ as function of symbols $\{a_n\}$. In the case of differential encoding applied to a PSK alphabet with M points, it is necessary to operate on the branch metric (35), equivalent to (9), which gives an expression identical to (11) of the first embodiment. The state of the trellis valid for (35) and (36) is given by (12). The number of states $S = M^{N-2}$ exponentially depends on N, though also in this case the complexity reduction techniques mentioned above can be used.

As for case C), reference shall be made to the considerations already made on the convolutional coding, in particular, (14) continues to apply, reported here for convenience:

$$c_{\eta n + l} = \prod_{m=1}^{K} a_{n-m}^{g_{ml}} \qquad (14)$$

with the same range of the used indexes. In this case the branch metrics (30) can be expressed in an equivalent manner in the form:

$$\lambda_n = \left| \sum_{i=0}^{N/\eta-1} \sum_{l=0}^{\eta-1} x_{\eta(n-i)+l} \tilde{c}_{\eta(n-i)+l}^* \right| - \left| \sum_{i=0}^{N/\eta-1} \sum_{l=0}^{\eta-1} x_{\eta(n-i)+l} \tilde{c}_{\eta(n-i)+l}^* \right| \qquad (37)$$

where the indexes n and i run on information symbols, l scans the code symbols associated with the (n−i)-th information symbol, and $$\frac{N}{\eta}$$

is analogous to the length L of the phase reconstruction memory expressed in term of information symbols. Similarly, the branch metric (35), equivalent to (9), is expressed as indicated in (15) of first embodiment.

Using (14) in (37) it is possible to express the code symbols as a function of the information symbols, obtaining:

$$\lambda_n = \left| \sum_{i=0}^{N/\eta-1} \sum_{l=0}^{\eta-1} x_{\eta(n-i)+l} \left( \prod_{m=1}^{K} a_{n-i-m}^{g_{ml}} \right)^* \right| - \left| \sum_{i=1}^{N/\eta-1} \sum_{l=0}^{\eta-1} x_{\eta(n-i)+l} \left( \prod_{m=1}^{K} a_{n-i-m}^{g_{ml}} \right)^* \right| \qquad (38)$$

likewise, using (14) in (15) we derive (16), also in the second embodiment of the present invention.

Case D) is referred to as a modulation type characterized by pulses having different energy, therefore the expression of the branch metric (35) can no longer be used. The sole expression one shall start from for the calculation of the branch metrics is the more general expression (30). In particular, (17), (18), (19) and (21) continue to apply, and are here reported for convenience:

$$a_n = \mu_n p_n; \qquad (17)$$

$$c_n = \mu_n q_n; \qquad (18)$$

$$q_n = p_n q_{n-1}; \qquad (19)$$

$$\tilde{q}_n^* \tilde{c}_{n-i} = \tilde{\mu}_{n-i} \tilde{q}_{n-i} \tilde{q}_n^* = \tilde{\mu}_{n-i} \tilde{p}_n^* \prod_{m=1}^{i-1} \tilde{p}_{n-m}^* \qquad (21)$$

Branch metrics (30) can be expressed as a function of the information symbols in such a way that the Viterbi algorithm also performs differential decoding. Multiplying for this purpose the terms $$\left| \sum_{i=0}^{N-1} x_{n-i}^* \tilde{c}_{n-i} \right| e \left| \sum_{i=1}^{N-1} x_{n-i}^* \tilde{c}_{n-i} \right|$$

of (30) by $|\tilde{q}_n^*| = 1$ considering (21) and the fact that $|\tilde{c}_n| = |\tilde{a}_n| = |\mu_n|$, we obtain:

$$\lambda_n = \left| \sum_{i=0}^{N-1} x_{n-i}^* \tilde{\mu}_{n-i} \prod_{m=0}^{i-1} \tilde{p}_{n-m}^* \right| - \left| \sum_{i=1}^{N-1} x_{n-i}^* \tilde{\mu}_{n-i} \prod_{m=0}^{i-1} \tilde{p}_{n-m}^* \right| - \frac{1}{2} |\tilde{a}_n|^2 \qquad (39)$$

differing from (22) relevant to the same case. On the basis of (39) the state of the trellis diagram can be defined as in (23), and similar results on the number of trellis states and applicable techniques to reduce the complexity hold.

The assumption of absence of intersymbol interference on the received signal is now removed, which means considering the filter DISP of FIG. 1, which models the transmission channel, no longer ideal. Consequently, the possibility to consider modulated pulses having equal energy also subsides, and the complex envelope s(t, a) must be intended as coming out from the filter DISP.

In the considered case of coded linear modulation, the signal s(t,a) can also be expressed in the form:

$$s(t, a) = \sum_{n=0}^{N_T-1} c_n h(t - nT). \qquad (0.3)$$

but now the impulse h(t) (known) includes also the dispersive filtering due to the transmission channel and therefore, no longer meets the Nyquist condition for the absence of intersymbol interference. Defining $$g_n \triangleq g(nT),$$

where $$g(t) \triangleq h(t) \otimes h^*(-t),$$

replacing (0.3) in expression (24) of the maximum likelihood sequence â estimated by the non-coherent receiver, introducing the approximation $\log I_0(x)=x$, and proceeding as previously done to obtain (25), we obtain the following decision strategy:

$$\hat{a} = \arg\max_{\tilde{a}} \left\{ -\frac{1}{2} \sum_{k=0}^{N_T-1} \sum_{n=0}^{N_T-1} \tilde{c}_k \tilde{c}_n^* g_{n-k} + \left| \sum_{n=0}^{N_T-1} x_n \tilde{c}_n^* \right| \right\}. \quad (40)$$

As already made before, we denote with $\{x_n\}$ the sample sequence at the output of the matched filter FRIC (FIG. 2), which sequence represents a sufficient statistic to decide according to (40) the symbols of the transmitted sequence. The samples $\{x_n\}$ can be expressed as:

$$x_n = \sum_{l=-L}^{L} g_l c_{n-l} e^{j\theta} + n_n \quad (41)$$

having indicated with L the channel memory, 2L+1 being the number of non zero samples of g(t), and $$n_n \triangleq m(nT),$$

where $$n(t) \triangleq w(t) \otimes h^*(-t).$$

The complex discrete random process $n_n$ is gaussian of course, zero mean and colored, with autocorrelation function $$R_n(m) \triangleq E\{n_n n_{n-m}^*\} = 2N_0 g_m.$$

An approach foreseeing the use of a matched filter in the presence of ISI to obtain a sufficient statistic, though relating to coherent receivers, is described in the article by G. Ungerboeck, under the title "ADAPTIVE MAXIMUM-LIKELIHOOD RECEIVER FOR CARRIER-MODULATED DATA-TRANSMISSION SYSTEM", published in IEEE Trans. Commun., vol. 22, pp. 624–635, May 1974.

An alternative procedure, and a preferred one as we will see, enabling obtaining a sufficient statistic to decode according to (40), employing a whitened matched filter FRIC (WMF, Whitened Matched Filter) (FIG. 2) to filter the received signal, is described in the article by G. D. Forney Jr., under the title "MAXIMUM-LIKELIHOOD SEQUENCE ESTIMATION OF DIGITAL SEQUENCES IN THE PRESENCE OF INTERSYMBOL INTERFERENCE", published in EEE Inform. Theory, vol. 18, pp. 363–378, May 1972. It is understood that the teachings of the two above mentioned approaches do not take away from the conceptional idea expressed in (30), but must be considered complementary to the same in the case ISI is present.

As is known, a whitening filter is a filter for which the noise at its output has a constant power spectral density. Its presence is justified by the fact that, due to the ISI, the received signal is affected by colored noise, while the expressions for the maximum likelihood sequence estimation were subject to the white noise assumption. The implementation of this filter is known to those skilled in the art, once the impulse response h(t) of the dispersive channel and therefore of the impulse g(t) are known. In practice the whitened matched filter FRIC of FIG. 2 may be (in the simplest cases) realized through the cascade of a matched filter and a whitening filter, in this case the sequence of samples $z_n$ at the output of such a filter has been indicated with $\{z_n\}$. When the "Forney approach" is considered, these samples $\{z_n\}$ shall replace the samples $x_n$ in FIGS. 2 and 3.

The samples $z_n$ can be expressed as:

$$z_n = y_n e^{j\theta} + w_n \quad (42)$$

where random variables $\{w_n\}$ are gaussian, zero mean, independent and with variance $\sigma_w^2 = 2N_0$ and:

$$y_n \triangleq \sum_{l=0}^{L} f_l c_{n-l} \quad (43)$$

where $\{f_l\}$ is the discrete time impulse response of the dispersion channel, obtained from the sequence $\{g_n\}$ through the whitening filtering, mentioned above. It is possible to obtain in the known way an alternative formulation of the strategy of the non-coherent optimal receiver based on the sample sequence $\{z_n\}$ indicated hereinafter also with the vector z. For this purpose, starting from the probability density function $p(z|\tilde{a},\theta)$ and averaging with respect to $\theta$ we obtain the likelihood function $p(z|\tilde{a})$ for non-coherent optimal decision.

Using again the approximation $\log I_0(x)=x$, the decision strategy becomes:

$$\hat{a} = \arg\max_{\tilde{a}} \left\{ -\frac{1}{2} \sum_{n=0}^{N_T-1} |\tilde{y}_n|^2 + \left| \sum_{n=0}^{N_T-1} z_n \tilde{y}_n^* \right| \right\} \quad (44)$$

where $\tilde{y}_n$ is defined as a function of $\tilde{c}_n$ according to (43).

We shall now describe the approaches that enable obtaining branch metrics concerning the two decision strategies (40) and (44), alternative between them. The intent is to use the Viterbi algorithm to evaluate the above mentioned expressions. The approaches foresee the introduction of appropriate approximations, in an almost similar way, as previously done starting from (25). Out of the two approaches, the one referring to strategy (40) (Ungerboeck) shall be developed, a similar procedure enables obtaining the expression of the branch metric even in the more profitable case of the strategy (44) (Forney).

First of all, let's define the following partial sequence metric:

$$\Lambda_n(\tilde{a}) \triangleq \left| \sum_{k=0}^{n-1} x_k \tilde{c}_k^* \right| - \frac{1}{2} \sum_{k=0}^{n-1} \sum_{n=0}^{n-1} \tilde{c} \tilde{c}_n^* g_{n-k} \quad (45)$$

-continued $$= \left|\sum_{k=0}^{n-1} x_k \tilde{c}_k^*\right| - \frac{1}{2}\sum_{k=0}^{n-1}\left\{|\tilde{c}_k|^2 g_0 + 2Re\left[\sum_{l=1}^{\min(L,k)} \tilde{c}\tilde{c}_{k-l}^* g_l^*\right]\right\}$$

where the property $g_n = g^*_{31\ n}$ has been used. After an initial transient, that is, for $n \geq L$, we can define the following metric:

$$\Lambda_n(\tilde{a}) \triangleq \Lambda_{n+1}(\tilde{a}) - \Lambda_n(\tilde{a}) \quad (46)$$

$$= \left|\sum_{k=0}^{n} x_k \tilde{c}_k^*\right| - \left|\sum_{k=0}^{n-1} x_k \tilde{c}_k^*\right| - \frac{1}{2}\left\{|\tilde{c}_n|^2 g_0 + 2Re\left[\sum_{l=1}^{L} \tilde{c}_n \tilde{c}_{n-l}^* g_l^*\right]\right\}.$$

The general sequence metric $\Lambda_{N_T}(\tilde{a})$ to be maximized, can in this way be recurrently calculated. Due to the fact that the two summations in (46) depend on the entire previous code sequence, the incremental metric has an unlimited memory that makes the calculation process difficult. Therefore, as in the case of absence of ISI, the maximization of the general sequence metric can be realized through a search on a tree diagram properly defined.

We can now introduce a truncation in the memory length of the incremental metric (46). For this purpose, in the first two summations of (46) only the more recent $N \ll N_T$ terms are considered. The incremental metric obtained through this memory truncation is:

$$\lambda_n(\tilde{a}) \triangleq \quad (47)$$

$$\left|\sum_{i=0}^{N-1} x_{n-i} \tilde{c}_{n-i}^*\right| - \left|\sum_{i=1}^{N-1} x_{n-i} \tilde{c}_{n-i}^*\right| - \frac{1}{2}\left\{|\tilde{c}_n|^2 g_0 + 2Re\left[\sum_{l=1}^{L} \tilde{c}_n \tilde{c}_{n-l}^* g_l^*\right]\right\}$$

valid for $n \geq \max\{N-1, L\}$. As a consequence of the memory truncation, the maximization of the sequence metric can now be recurrently performed through a search on an appropriately defined trellis diagram, using the Viterbi algorithm with branch metrics given by (47). Also in this case the parameter N is interpretable as a phase reconstruction memory.

Starting from the alternative approach (Forney) inborn in the strategy (44), using similar approximations a second non-coherent decoding scheme can be determined. The branch metrics obtained in this case can be expressed as follows:

$$\lambda_n(\tilde{a}) \triangleq \left|\sum_{i=0}^{N-1} z_{n-i} \tilde{y}_{n-i}^*\right| - \left|\sum_{i=1}^{N-1} z_{n-i} \tilde{y}_{n-i}^*\right| - \frac{1}{2}|\tilde{y}_n|^2. \quad (48)$$

Even if the two non-coherent receivers based on branch metrics (47) and (48) derive from two equivalent formulations of the optimal non-coherent strategy, they do not give however the same performance, because the approximations introduced do not have the same effect in the two cases. In the case of strategy (40) (Ungerboeck approach), the sample $x_n$ is correlated with the code symbol $\tilde{c}_n$, while in the case of strategy (44) (Forney approach), the sample $z_n$ is correlated with $\tilde{y}_n$. Along the correct path, the sequences $\{z_n\}$ and $\{\tilde{y}_n\}$ differ only for the sequence of independent noise samples $\{w_n\}$, as is clear from (42), while sequences $\{x_n\}$ and $\{\tilde{c}_n\}$ are significantly more different due to ISI and noise correlation. These two effects tend to cancel out in the general sequence metric, while they are significant in the branch metrics (47). Therefore, given the complexity of the receiver, the receiver based on strategy (44) (Forney approach) gives significantly better performance and shall then be taken as reference for the development of the receiver valid for non linear modulations.

As for the implementation of a receiver, whose operation is based on the assumptions of the previous description, that takes into account the ISI, the receiver RIC of FIG. 2 continues to be valid, with the appropriate modifications in the blocks METRIC(s), and provided that the correct filter FRIC is used, differently specified for the two implementation approaches.

Finally, the case of continuous phase non linear modulations is considered, referred to by the acronym CPM (Continuous Phase Modulation), concerning the second embodiment of the present invention.

The complex envelope of a CPM signal, as known, has the form:

$$s(t, \tilde{a}) = \sqrt{\frac{2E_s}{T}} \exp\left\{j2\pi h \sum_n a_n q(t - nT)\right\} \quad (49)$$

where $E_s$ is the energy per information symbol, T is the symbol interval, $h = k/p$ is the modulation index, ( k and p are prime numbers between them), the information symbols $\{a_n\}$ are assumed as independent, equiprobable, and with values in the M-ary alphabet $\{\pm 1, \pm 3, \ldots, \pm(M-1)\}$ and vector a indicates the sequence of information symbols. The case of using channel coding techniques is not explicitly considered but the following considerations can be easily extended. The function q(t) is the phase response of the modulation and it is assumed to satisfy the following normalization conditions:

$$q(t) = \begin{cases} 0 & \text{per } t \leq 0 \\ 1/2 & \text{per } t \geq L_q T \end{cases} \quad (50)$$

where $L_q$ is a positive integer and $L_q T$ is the duration of the frequency pulse g(t) defined by:

$$g(t) \triangleq \frac{dq(t)}{dt} \quad (51)$$

Using a representation described in the following articles to express (49): P. A. Laurent, "EXACT AND APPROXIMATE CONSTRUCTION OF DIGITAL PHASE MODULATIONS BY SUPERPOSITION OF AMPLITUDE MODULATED PULSES (AMP)", published in IEEE Trans. Commun., vol. 34, pp. 150–160, February 1986; U. Mengali and M. Morelli, "DECOMPOSITION OF M-ary CPM SIGNALS INTO PAM WAVEFORMS", published in IEEE Trans. Information Theory, vol. 41, pp. 1265–1275, September 1995, we come to the following exact expression of the complex envelope (49):

$$s(t, a) = \sum_{k=0}^{Q^{\log_2 M}(M-1)-1} \sum_n \alpha_{k,n} h_k(t - nT) \quad (52)$$

where M, for notation simplicity, is assumed to be a power of 2, $$Q \triangleq 2^{L_q-1},$$

and the expressions of pulses $\{h_k(t)\}$ and symbols $\{\alpha_{k,n}\}$ as a function of the sequence of information symbols $\{a_n\}$ are reported in the just mentioned paper by Mengali and Morelli. Truncating the summation (52) at the first $K < Q^{log_2 M}(M-1)$ terms, we obtain an approximation of s(t, a). As shown in the last mentioned article, the signal power is concentrated in the first M−1 components, that is, those associated with the pulses $\{h_k(t)\}$ with $0 < k \leq M-2$, called principal pulses. Consequently, a value K=M−1 can be used in (52) to obtain the best compromise between quality of approximation and number of signal components, it has been demonstrated that a receiver based on the sole principal pulses gives a performance practically coinciding with that of an optimal coherent receiver. For K=M−1, the approximation based on the sole principal pulses can be slightly improved modifying the pulses $\{h_k(t)\}$ in order to minimize the mean square error between the signal and its approximation. For instance, for a quaternary CPM modulation, assuming K=3 and breaking off the information symbol $a_n \in \{\pm 1, \pm 3\}$ in two binary symbols $\gamma_{n,0}$ e $\gamma_{n,1}$ belonging to the alphabet $\{\pm 1\}$ we can write:

$$a_n = 2\gamma_{n,1} + \gamma_{n,0} \tag{53}$$

Assuming that the modulation index h and also 2h of (49) are not integers, the symbols associated with the first three signal components can be expressed in the form:

$$\alpha_{0,n} = \alpha_{0,n-1} e^{jh\pi a_n}$$
$$\alpha_{1,n} = \alpha_{0,n-1} e^{j2h\pi \gamma_{n,1}} \tag{54}$$
$$\alpha_{2,n} = \alpha_{0,n-1} e^{jh\pi \gamma_{n,0}}$$

With reference to FIG. 8, let us now introduce the non-coherent receiver for CPM signals, implemented as indicated by the reception process forming the object of the second embodiment of the present invention. As can be noticed, the receiver RIC of FIG. 8 differs from that of FIG. 2 mainly due to the front-end structure, which in FIG. 2 consists of a sole reception filter RIC followed by the sampler CAMP, while in FIG. 8 it consists of a multidimensional whitened matched filter WMF (Whitened Matched Filter). The front-end WMF includes a bank of digital filters matched to relevant pulses $\{h_k(t)\}$, driven in parallel by the received signal r(t), each one followed by a sampler at symbol rate that sends its own samples $\{x_{k,n}\}$ to the input of a single whitening filter WF (Whitening Filter) of the multidimensional type from which the samples $z_n$ come out. The remaining structure is identical in the two figures, pointing out that, in FIG. 8, the delay line T is realized in a vectorial way, as well as vectorial is the calculation of the branch metrics made by the block METRICTOT, whose blocks METRIC(s) (FIG. 3) using (of course) different expressions versus those under the same name of FIG. 3.

Returning to the procedure, we can easily demonstrate that the signals coming out from the filter bank matched to the pulses $h_k(t)$ of FIG. 8, sampled at symbol frequency, represent a sufficient statistic for non-coherent detection of a CPM signal. This assumed, it is convenient to use a simplified representation of a CPM signal, based on the sole principal pulses, enabling a significant complexity reduction, in practice without any performance loss.

The signal coming out from a filter matched to the pulse $h_k(t)$, sampled at the instant nT, can be expressed in the form:

$$x_{k,n} \triangleq r(t) \otimes h_k(-t)\big|_{t=nT} = s_{k,n} e^{j\theta} + n_{k,n} \tag{55}$$

where:

$$n_{k,n} \triangleq w(t) \otimes h_k(-t)\big|_{t=nT} \tag{56}$$

$$s_{k,n} \triangleq s(t,a) \otimes h_k(-t)\big|_{t=nT} = \sum_{m=0}^{K-1} \sum_i \alpha_{m,i} g_{m,k}[(n-i)T] \tag{57}$$

and $$g_{m,k}(t) \triangleq h_m(t) \otimes h_k(-t). \tag{58}$$

As can be noticed from (57), $S_{k,n} \neq \alpha_{k,n}$ due to the ISI and the interference of the other signal components. Noise terms are also characterized by the cross-correlation function:

$$E\{n_m(t) n^*_k(t-\tau)\} = 2N_0 g_{m,k}(-\tau) \tag{59}$$

which depends on the pulses $g_{m,k}(t)$.

The whitening filter WF has been introduced in the front-end WMF of FIG. 8 since we found it convenient to process the sequences coming out from the different matched filters through a whitening filter of the type described above for linear modulated signals (Forney approach), it is possible in this way to extend to the CPM modulation the advantage of better operation performance with a reduced complexity of the receiver RIC. For this purpose we define:

$$x_n \triangleq (x_{0,n}, x_{1,n}, \ldots, x_{K-1,n})^T \tag{60}$$

$$s_n \triangleq (s_{0,n}, s_{1,n}, \ldots, s_{K-1,n})^T \tag{61}$$

$$n_n \triangleq (n_{0,n}, n_{1,n}, \ldots, n_{K-1,n})^T \tag{62}$$

$$\vec{a}_n \triangleq (\alpha_{0,n}, \alpha_{1,n}, \ldots, \alpha_{K-1,n})^T \tag{63}$$

$$G_n \triangleq [g_{i,j}(nT)] \quad i, j = 0, i, \ldots, K-1 \tag{64}$$

representing respectively, in matrix notation and at the discrete time instant n, sampled signals ($x_n$) coming out from the bank of K matched filters included in the block WMF, their signal ($S_n$) and noise ($n_n$) components, symbols $\bar{a}_n$ of the K signal components of Laurent representation (52), and the samples of the impulse response at output of the matched filter bank, grouped in a matrix ($G_n$) of K×K elements. By this matrix notation the vector of the observable, of K elements, can be expressed in the form:

$$x_n = s_n e^{j\theta} + n_n = e^{j\theta} \sum_{l=-L}^{L} G_l^T \vec{a}_{n-l} + n_n \tag{65}$$

where L, related with the duration $L_q T$ of the frequency pulse, is a parameter representing the memory associated with the modulation process. The matrix covariance function of the vectorial noise process at discrete time $n_m$ can also be defined as:

$$R_n(m) \stackrel{\Delta}{=} E\{n_n n_{n-m}^{*T}\} = 2N_0 G_{-m} = 2N_0 G_m^T \tag{66}$$

where the property $g_{m,k}(t)=g_{k,m}(-t)$ has been used.

Proceeding to the bilateral Z transform Z[•] of matrix sequences previously introduced, we can define:

$$X(z) \stackrel{\Delta}{=} z[x_n] = \sum_{m=-\infty}^{\infty} x_m z^{-m} \tag{67}$$

$$N(z) \stackrel{\Delta}{=} z[n_n] = \sum_{m=-\infty}^{\infty} n_m z^{-m} \tag{68}$$

$$A(z) \stackrel{\Delta}{=} z[\vec{\alpha}_n] = \sum_{m=-\infty}^{\infty} \vec{\alpha}_m z^{-m} \tag{69}$$

$$G(z) \stackrel{\Delta}{=} z[G_n] = \sum_{m=-\infty}^{\infty} G_m z^{-m} \tag{70}$$

$$\vec{\Phi}(z) \stackrel{\Delta}{=} z[R_n(n)] = \sum_{m=-\infty}^{\infty} R_n(m) z^{-m} = 2N_0 G(z^{-1}) = 2N_0 G^T(z). \tag{71}$$

The spectral matrix $\vec{\Phi}(z)$ of the vector process $n_n$ is certainly non negative definite on the unit circle. We shall assume that it is positive definite for the reasons described below. In fact, if the determinant $|\vec{\Phi}(z)|$ were zero as well on the circle of unit radius, it would be simple to demonstrate that in this case the time-discrete random processes $\{n_{k,n}\}$ would be linearly dependent and therefore it would be possible to obtain an alternative sufficient statistic simply eliminating the outputs $\{x_{k,n}\}$ whose noise components can be expressed, with unitary probability, as linear combination of the other ones. Strictly speaking, for CPM signals there is no reasonable probability that this possibility is verified. However, in some practical cases it can occur that the matrix $\vec{\Phi}(z)$ is ill conditioned. In this case a simple countermeasure consists in eliminating some component signals. For instance, in the case of the quaternary CPM with raised cosine frequency pulse (RC, Rised Cosine) with $L_q=2(2RC)$, 2 main pulses, $h_1$ (t) e $h_2$ (t), are very similar. These pulses can be replaced by a mean pulse $h_e$ (t) with corresponding symbol $$\alpha_{e,k} \stackrel{\Delta}{=} \alpha_{1,k} + \alpha_{2,k}.$$

In the hypothesis of a spectral matrix $\vec{\Phi}(z)$ positive definite on the circle of unit radius it is possible to obtain a factorization that enables to perform the whitening filtering and the advantages mentioned before. The factorization method can be obtained from the following articles:

"THE FACTORIZATION OF DISCRETE-PROCESS SPECTRAL MATRICES", by P. R. Mothyka and J. A. Cadzow, published in IEEE Trans. Automat. Contr., vol. 12, pp. 698–707, December 1967;

"FACTORIZATION OF DISCRETE-PROCESS SPECTRAL MATRICES", by D. N. Prabhakar Murthy, published in IEEE Trans. Inform. Theory, vol. 19, pp. 693–696, September 1973.

Applying the teaching contained in the above articles it is possible to find a matrix F(z) such that:

$$\vec{\Phi}(z)=2N_0 G^T(z)=2N_0 F(z^{-1})F^T(z) \tag{72}$$

and such that the determinant $|F(z^{-1})|$ has no zeros inside the unit circle of convergence of the Z-transform. Therefore a sufficient statistic can be obtained filtering the vector signal $\{x_n\}$ with a multidimensional filter WF of K×K elements whose transfer function is $F^{-1}(z^{-1})$. The vector resulting from this filtering is:

$$z_n = y_n e^{j\theta} + w_n \tag{73}$$

where $\{y_n\}$ is the result of the total filtering performed on the useful component of said modulated signal $\{s_n\}$.

The Z-transform of (65) is:

$$X(z)=G^T(z)A(z)\,e^{j\theta}+N(z)=F(z^{-1})\,F^T(z)A(z)e^{j\theta}+N(z). \tag{74}$$

Consequently, the Z-transform of $\{y_n\}$ is:

$$Y(z) = \sum_{m=-\infty}^{\infty} y_m z^{-m} = F^T(z)A(z). \tag{75}$$

We can demonstrate that the inverse transform of F(z) has only L+1 non-zero elements $F_l$. Therefore the signal $\{y_n\}$ can be expressed as:

$$y_n = \sum_{l=0}^{L} F_l^T \alpha_{n-l}. \tag{76}$$

As can be noticed, the vector form of (76) is similar to the one of the scalar expression (43) for linear modulation with ISI, irrespective of the coding. This result is a consequence of of Laurent decomposition of CPM signals.

Since the spectral matrix of the time-discrete noise process $w_n$ is:

$$\vec{\Phi}_w(z)=F^{-1}(z^{-1})\vec{\Phi}_n(z)F^{-1T}(z)=2N_0 I \tag{77}$$

the filter $F^{-1}(z^{-1})$ is a multidimensional whitening filter, coinciding with the WF filter of FIG. 8, which can be determined as a generalization of the whitening filter used in the case of linear modulations with ISI. For the physical implementation of such a filter it is necessary to introduce a delay in order to assure causality.

The WMF front-end of the receiver RIC of FIG. 8 can be specified as a multidimensional whitened matched filter with 1 input and K outputs, implemented through the cascade of a matched filter with 1 input and K outputs and of a whitening filter having size K×K. We have not considered the case of a determinant of the spectral matrix $\vec{\Phi}_n(z)$ with zeros on the circle of unit radius considering that it is not a case of practical significance in CPM modulations. However, this situation can be faced by means of the concept of pole-zero cancellation, also used by Forney to define the whitened matched filter in case of signals with zeroes in the band.

Using $\{z_n\}$ as sufficient statistic, we can easily determine the optimal non- coherent decision strategy for CPM modulations. Continuing as indicated, to come to strategy (44) (Forney approach), we can see that this strategy for CPM modulations is an extension of (44) where a summation on the K components of the CPM signal is additionally present. Using the approximations already highlighted, which lead to the expression of the branch metric (48), branch metrics for CPM modulations assume now the following expression:

$$\lambda_n(\vec{a}) \triangleq \left| \sum_{k=0}^{K-1} \sum_{i=0}^{N-1} z_{k,n-i} \tilde{y}_{k,n-i}^* \right| - \left| \sum_{k=0}^{K-1} \sum_{i=1}^{N-1} z_{k,n-i} \tilde{y}_{k,n-i}^* \right| - \frac{1}{2} \sum_{k=0}^{K-1} |\tilde{y}_{k,n}|^2 \qquad (78)$$

where $\tilde{y}_{k,n}$ is defined in an obvious manner according to (76) as a function of the hypothetical sequence of information symbols. The number of states depends on N. For instance, using only the principal pulses, that is a value K=M−1, for which $\vec{\alpha}_n$ depends only an $a_n$, see (53) and (54), the number of states of the trellis is $S=M^{N+L-1}$ and can be reduced anyway employing the known techniques. It has been verified that, as in the case of linear modulations in absence of ISI, even using small values of N in (78), the receiver RIC of FIG. 8 has a performance very similar to that obtained with coherent receivers.

The digital hardware of the receiver RIC of FIGS. 1, 2, 3, and 8 for the considered cases A), B), C), D) and CPM, and possible receivers derived from it, can be conveniently implemented through digital integrated circuits of the ASIC type (Application Specific Integrated Circuit). This implementation method can be preferred with respect to the use of a mathematical microprocessor in the case where the receiver must reach high operation speeds. The high operation speed that can be obtained can be drawn in itself from the modularity of the structure METRICTOT shown in FIG. 3, enabling the parallel processing of branch metrics.

Therefore, while particular embodiments of the present invention have been shown and described, it should be understood that the present invention is not limited thereto since other embodiments may be made by those skilled in the art without departing from the true spirit and scope thereof. It is thus contemplated that the present invention encompasses any and all such embodiments covered by the following claims.

What is claimed is:

1. A non-coherent reception process of information symbol sequences, obtained by amplitude and/or phase digital modulation of a carrier, transmitted on a communication channel affected by additive white gaussian noise, based on use of the Viterbi algorithm applied to a trellis whose branches represent possible transitions among states defined by possible subsequences of information symbols, having finite length, through which algorithm at each symbol interval, paths are selected on the trellis such that a cumulative path metric of transition metrics is maximum, said path metric being indicative of the likelihood degree existing among symbols of a path associated with the same path metric and a sequence of transmitted symbols, wherein each said transition metric ($\lambda_n^{(s)}$) is calculated through the following steps:

a) non-coherent base band conversion of a received signal, filtering of the converted signal (r(t)) through a filter (FRIC) matched to a transmitted pulse and sampling at symbol frequency of the filtered signal, to obtain a sequence of complex samples ($\{x_n\}$);

b) construction of a phase reference by accumulating N−1 products among said sequential complex samples ($x_{n-1}, \ldots, x_{n-N+1}$), conjugated, and corresponding code symbols ($\tilde{c}_{n-1}, \ldots, \tilde{c}_{n-N+1}$), also complex, univocally associated with a relevant branch of the trellis, the number N−1 being the finite length, selected in order to obtain the desired accuracy in the constructed phase, said accuracy increasing as N increases;

c) normalization of the value of said phase reference, through division by its modulus;

d) replacement of a phase reference, or phasor ($e^{-j\Theta}$) of said modulated carrier, present in a known analytical expression of transition metrics used by a coherent receiver with the normalized phase reference resulting from said step c), obtaining an analytical expression for the calculation of each of said transition metrics ($\lambda_n^{(s)}$).

2. The non-coherent reception process according to claim 1, wherein, in presence of linear modulations, said analytical expression for the calculation of transition metrics, at the n-th discrete instant, is:

$$\lambda_n = \frac{\text{Re}\left\{ \sum_{i=1}^{N-1} x_n x_{n-i}^* \tilde{c}_n^* \tilde{c}_{n-i} \right\}}{\left| \sum_{i=1}^{N-1} x_{n-i}^* \tilde{c}_{n-i} \right|} - \frac{|\tilde{c}_n|^2}{2}$$

where: $\lambda_n$ is a generic branch metric; ($\tilde{c}_{n-1}, \ldots, \tilde{c}_{n-N+1}$) are N code symbols univocally associated with a relevant branch of the trellis; ($x_{n-1}, \ldots, x_{n-N+1}$) are N sequential samples obtained by filtering said converted signal (r(t)) through said filter (FRIC) matched to the transmitted pulse; the asterisk (*) denoting complex conjugate values.

3. The non-coherent reception process according to claim 2, wherein, said code symbols ($\{\tilde{c}_n\}$) correspond to M discrete phase values of said modulated carrier, or M-PSK said analytical expression for calculating the transition metrics, at the n-th discrete instant, is:

$$\lambda_n = \text{Re}\left\{ \sum_{i=1}^{N-1} x_n x_{n-i}^* \tilde{c}_n^* \tilde{c}_{n-i} \right\}$$

where: $\lambda_n$ is a generic transition metric; $\tilde{c}_{n-i}$ are N-MPSK symbols univocally associated with a relevant branch of the trellis; and $x_{n-i}$ are N sequential samples obtained by filtering said converted signal (r(t)) through said filter (FRIC) matched to the transmitted pulse; the asterisk (*) denoting complex conjugate symbols and samples.

4. The non-coherent reception process according to claim 3, wherein, when differential coding is used, said analytical expression for calculating the transition metrics, at the n-th discrete instant, is:

$$\lambda_n = \text{Re}\left\{ \sum_{i=1}^{N-1} x_n x_{n-i}^* \prod_{m=0}^{i-1} \tilde{a}_{n-m}^* \right\}$$

where $\tilde{a}_{n-m}^*$ are N M-PSK symbols univocally associated with a relevant branch of the trellis.

5. The non-coherent reception process according to claim 2, wherein, when said modulation is implemented through M discrete phase and amplitude values, or M-QAM, and quadrant differential coding is used, and analytical expression for calculating the transition metrics, at the n-th discrete instant, is:

$$\lambda_n = \frac{\mathrm{Re}\left\{\sum_{i=1}^{N-1} x_n x_{n-i}^* \tilde{a}_n^* \tilde{\mu}_{n-i} \prod_{m=1}^{i-1} \tilde{p}_{n-m}^*\right\}}{\left|\sum_{i=1}^{N-1} x_{n-i}^* \tilde{\mu}_{n-i} \tilde{p}_n^* \prod_{m=1}^{i-1} \tilde{p}_{n-m}^*\right|} - \frac{|\tilde{a}_n|^2}{2}$$

where: $\lambda_n$ is a generic transition metric; $\tilde{a}_n$ are N M-QAM symbols univocally associated with a relevant branch of the trellis; $\tilde{p}_n$ are N symbols that assume values $\{\pm 1, \pm j\}$; $\mu_n$ is the symbol $\tilde{a}_n$ multiplied by a phasor performing a rotation of an angle multiple of $\pi/2$ that brings it in the first quadrant of the complex plane; and $x_n$ are N sequential samples obtained by filtering said converted signal (r(t)) though said filter (FRIC) matched to the transmitted pulse; the asterisk (*) denoting complex conjugate symbols and samples.

6. The non-coherent reception process according to claim 2, wherein when said modulation is implemented through M discrete phase values, or M-PSK, and convolutional coding is used, said analytical expression for the calculation of the transition metrics, at the n-th discrete instant, is:

$$\lambda_n = \mathrm{Re}\left\{\sum_{i=1}^{L-1}\sum_{j=0}^{\eta-1}\sum_{l=0}^{\eta-1} x_{\eta n+j} x_{\eta(n-i)+l}^* \left(\prod_{m=1}^{K} \tilde{a}_{n-m}^{g_{mj}}\right)^* \prod_{k=1}^{K} \tilde{a}_{(n-i)-k}^{g_{kl}}\right\}$$

where: $\lambda_n$ is a generic transition metric; $\tilde{a}_n$ are L+K−1 M-PSK symbols univocally associated with a relevant branch of the trellis; $x_n$ are N sequential samples obtained by filtering said converted signal (r(t)) though said filter (FRIC) matched to the transmitted pulse; the asterisk (*) denoting complex conjugate symbols and samples; K is the code constraint length; and $\eta$ is a number of K-tuples $g_{mj}$, $g_{kl}$ of constants defining code generators, such that the code rate is $1/\eta$.

7. The non-coherent reception process according to claim 1, wherein, when coded symbols ($\{c_n\}$), are information symbols ($\{a_n\}$) undergoing a differential coding followed by a channel coding invariant to phase rotations of said carrier, said trellis is built on said information symbols ($\{a_n\}$), said Viterbi algorithm performing the maximum likelihood estimation of a sequence of said information symbols ($\{a_n\}$).

8. A non-coherent reception process of information symbol sequences obtained through phase and/or amplitude digital modulation of a carrier, transmitted on a communication channel affected by additive white gaussian noise, based on a use of the Viterbi algorithm applied to a trellis whose branches represent possible transitions among states defined by possible sub-sequences of information symbols of finite length, through which algorithm, each symbol interval, paths are selected on the trellis such that a cumulative path metric of transition metrics is maximum, said path metric being indicative of the likelihood degree existing among the symbols of the path associated with the same path metric and a sequence of transmitted symbols, wherein each of said transition metrics ($\lambda_n^{(s)}$) is calculated through the following steps:
 a) non-coherent base band conversion of a received signal, subsequent filtering of the converted signal (r(t)) through a filter (FRIC) matched to a transmitted pulse and sampling at symbol frequency of the filtered signal, to obtain a sequence of complex samples ($\{x_n\}$);
 b) identification of a maximizing function corresponding to a known expression for maximum likelihood sequence estimation of a non-coherent receiver, as an expression of a general metric associated with said sequence of complex samples ($\{x_n\}$);
 c) expression of a partial metric, obtained by considering said general metric up to a current n-th sample of said sequence of complex samples ($\{x_n\}$);
 d) expression of an incremental metric, of unlimited memory, obtained from the difference between the expression of said partial metric at a current signalling interval and at an immediately preceding interval;
 e) truncation of the length of said unlimited memory at N-1 samples of said sequence of complex samples $\{x_n\}$ preceding the current sample, obtaining the analytical expression of said transition metrics ($\lambda_n^{(s)}$) of said trellis, built on the basis of all the possible symbol subsequences having length N;
 f) calculation of said general metric through recurrent updating of said partial metric.

9. The non-coherent reception process according to claim 8, wherein in the presence of linear modulation, said analytical expression for the calculation of the transition metrics ($\lambda_n^{(s)}$), at the n-th discrete instant, is:

$$\lambda_n = \left|\sum_{i=0}^{N-1} x_{n-i} \tilde{c}_{n-i}^*\right| - \left|\sum_{i=1}^{N-1} x_{n-i} \tilde{c}_{n-i}^*\right| - \frac{1}{2}|\tilde{c}_n|^2$$

where: $\lambda_n$ is a generic transition metric; $\tilde{c}_{n-i}$ are N code symbols univocally associated with a relevant branch of the trellis; $x_{n-i}$ are N sequential samples obtained by filtering said converted signal (r(t)) through said filter (FRIC) matched to the transmitted pulse; the asterisk (*) denoting complex conjugate values.

10. The non-coherent reception process according to claim 9, wherein, when said modulation is implemented through M distinct phase values and in the presence of modulated pulses of equal energy, or M-PSK, said analytical expression for the calculation of the transition metrics ($\lambda_n^{(s)}$), at the n-th discrete instant, is simplified as:

$$\lambda_n = \left|\sum_{i=0}^{N-1} x_{n-i} \tilde{c}_{n-i}^*\right| - \left|\sum_{i=1}^{N-1} x_{n-i} \tilde{c}_{n-i}^*\right|.$$

11. The non-coherent reception process according to claim 9, wherein, said modulation is followed by a differential encoding according to $c_n = c_{n-1} a_n$, said analytical expression for the calculation of the transition metrics ($\lambda_n^{(s)}$), at the n-th discrete instant, is:

$$\lambda_n = \left|\sum_{i=0}^{N-1} x_{n-i} \prod_{m=0}^{i-1} \tilde{a}_{n-m}^*\right| - \left|\sum_{i=1}^{N-1} x_{n-i} \prod_{m=0}^{i-1} \tilde{a}_{n-m}^*\right|$$

where $\tilde{a}_{n-m}^*$ are N M-PSK symbols univocally associated with a relevant branch of the trellis.

12. The non-coherent reception process according to claim 9, wherein, when said modulation is implemented through M discrete values of phase and amplitude, or M-QAM, and quadrant differential coding is used, and analytical expression for the calculation of the transition metrics ($\lambda_s^{(s)}$), at the n-th discrete instant, is:

$$\lambda_n = \left| \sum_{i=0}^{N-1} x_{n-i}^* \tilde{\mu}_{n-i} \prod_{m=0}^{i-1} \tilde{p}_{n-m}^* \right| - \left| \sum_{i=1}^{N-1} x_{n-i}^* \tilde{\mu}_{n-i} \prod_{m=0}^{i-1} \tilde{p}_{n-m}^* \right| - \frac{1}{2}|\tilde{a}_n|^2$$

where: $\tilde{a}_n$ are N M-QAM symbols univocally associated with a relevant branch of the trellis; $\tilde{p}_n$ are N symbols assuming values $\{\pm 1, \pm j\}$; $\tilde{u}_n$ is the symbol $\tilde{a}_n$ multiplied by a phasor performing a rotation of an angle multiple $\pi/2$ that brings it in a first quadrant of the complex plane.

13. The non-coherent reception process according to claim 9, wherein, when said modulation is implemented through M discrete phase values, or M-PSK, and convolutional coding is used, said analytical expression for the calculation of the transition metrics ($\lambda_n^{(s)}$), at the n-th discrete instant, is:

$$\lambda_n = \left| \sum_{i=0}^{N/\eta-1} \sum_{l=0}^{\eta-1} x_{\eta(n-i)+l} \tilde{c}_{\eta(n-i)+l}^* \right| - \left| \sum_{i=1}^{N/\eta-1} \sum_{l=0}^{\eta-1} x_{\eta(n-i)+l} \tilde{c}_{\eta(n-i)+l}^* \right|$$

where: indexes n and i run over the information symbols, l scans code symbols associated with the (n−i)-th information symbol, and $1/\eta$ is a code rate.

14. The non-coherent reception process according to claim 8, wherein in the presence of a linear modulation and a dispersive channel the signal converted in base band (r(t)), filtered by said filter (FRIC) matched to the transmitted pulse, is additionally filtered by a whitening filter (WF) such that noise at the input of said filter yields at the output a constant power spectral density.

15. The non-coherent reception process according to claim 14, wherein complex samples output by said whitening filter assume the expression:

$$z_n = y_n e^{j\theta} + w_n;$$

where $$y_n = \sum_{l=0}^{L} f_l c_{n-l},$$

$\{f_e\}$ being the discrete time pulse response of the dispersive channel, and $\{w_n\}$ being a sequence of random pulses representing whitened noise.

16. The non-coherent reception process according to claim 15, wherein said analytical expression for the calculation of the transition metrics ($\lambda_n^{(s)}$), at the n-th discrete instant, is:

$$\lambda_n = \left| \sum_{i=0}^{N-1} z_{n-i} \tilde{y}_{n-i}^* \right| - \left| \sum_{i=1}^{N-1} z_{n-i} \tilde{y}_{n-i}^* \right| - \frac{1}{2}|\tilde{y}_n|^2.$$

17. The non-coherent reception process according to claim 8, wherein, in the presence of non-linear modulations of the continuous phase type, otherwise called CPM (Continuous Phase Modulations), such that a modulated signal s(t, a) can be expressed as a summation of K pulses h(t) multiplied by relevant symbols ($\alpha_{k,n}$), said base band converted signal (r(t)) is filtered by a bank of K filters placed in parallel, each one matched to a relevant pulse of the summation, and the K numeric samples of the filtered signals, grouped in an algebraic vector $x_n$ of K elements, are additionally filtered by a multidimensional whitening filter (WF), organized in the form of matrix of K×K elements, such that a noise vector $n_n$ at the input of said whitening filter yields at the output a constant power spectral density and uncorrelated components.

18. The non-coherent reception process according to claim 17, wherein the complex samples from said whitening filter form a vector $z_n$ that assumes the expression:

$$z_n = y_n e^{j\theta} + w_n$$

where $\{y_n\}$ is the result of global filtering underwent by a useful component of said modulated signal $\{s_n\}$, and $w_n$ is a vector whose elements are obtained from the whitening filtering of corresponding elements of said noise vector $n_n$.

19. The non-coherent reception process according to claim 18, wherein said analytical expression for the calculation of the transition metrics ($\lambda_n^{(s)}$), at the n-th discrete instant, is:

$$\lambda_n = \left| \sum_{k=0}^{K-1} \sum_{i=0}^{N-1} z_{k,n-i} \tilde{y}_{k,n-i}^* \right| - \left| \sum_{k=0}^{K-1} \sum_{i=1}^{N-1} z_{k,n-i} \tilde{y}_{k,n-i}^* \right| - \frac{1}{2} \sum_{k=0}^{K-1} |\tilde{y}_{k,n}|^2.$$

20. The non-coherent reception process according to claim 1 or 8, wherein, when said states are defined by a number of symbols less than N-1, the missing code symbols for the purpose of calculation of said transition metrics are found in a relevant path surviving selection on the trellis operated by the Viterbi algorithm.

21. The non-coherent reception process according to claim 1 or 8, wherein, when said sequences of information symbols include also pilot symbols, known at the reception side, and at a discrete k-th instant a pilot symbol is recognized, said cumulative metrics are subsequently calculated only on paths ending in states compatible with said pilot symbol.

22. A non-coherent receiver of sequences of coded symbols ($\{c_n\}$) obtained by amplitude and/or phase digital modulation of a carrier, transmitted on a communication channel affected by additive white gaussian noise, including:

a non-coherent converter base band converting a received signal, followed by a filter (FRIC) matched to transmission pulse, followed in turn by a sampler (CAMP) sampling at symbol frequency, which obtains a sequence of complex samples $\{x_n\}$;

a phase reconstruction memory (SHF1) in which N-1 samples ($x_{n-1}, \ldots, x_{n-N+1}$) of said sequence of complex samples $\{x_n\}$ preceding a current sample ($x_n$) are stored;

a calculator calculating transition metrics ($\lambda_n^{(s)}$) of a trellis sequential diagram, or trellis, whose branches represent possible transitions among states defined by possible subsequences of information symbols of finite length;

a Viterbi processor adapted to select paths on the trellis such that a cumulative path metric of transition metrics is maximum, said path metric indicating the likelihood level existing among symbols ($\{\tilde{c}_k\}$) of a relevant path and a sequence of transmitted symbols, wherein said calculator is subdivided into a plurality of identical sub-calculators, each being adapted to calculate a relevant transition metric ($\lambda_n^{(s)}$), including:

a memory for N code symbols ($\tilde{c}_{n-1}, \ldots, \tilde{c}_{n-N+1}$) univocally associated with a relevant branch of the trellis;

a phase reference constructor controlled by said N-1 samples ($x_{n-1}, \ldots, x_{n-N+1}$) stored in said phase reconstruction memory (SHF1) and by N-1 said code symbols ($\tilde{c}_{n-1}, \ldots, \tilde{c}_{n-N+1}$) corresponding to said samples;

a first multiplier adapted to multiply said current sample ($x_n$) by the conjugate of a code symbol ($\tilde{c}_n$) corresponding to said current sample;

a second multiplier adapted to multiply the result from said first multiplier by the conjugate of a reconstructed phase reference;

an extraction unit extracting the real part of the result from said second multiplier;

a modulus calculator calculating the modulus of said constructed phase reference;

a normalizer dividing said real part by said modulus;

a first adder adding the quotient result from said normalizer with the square modulus, changed in sign and divided by two, of said code symbol ($\tilde{c}_n$) corresponding to said current sample ($x_n$), to obtain a relevant transition metric ($\lambda_n^{(s)}$).

23. The receiver according to claim 22, wherein said phase reference constructor includes;

N-1 multipliers to multiply said N-1 samples ($x_{n-1}, \ldots, x_{n-N+1}$) stored in said phase reconstruction memory (SHF1) by a complex conjugate of said corresponding N-1 code symbols ($\tilde{c}_{n-1}, \ldots, \tilde{c}_{n-N+1}$); and a second adder adding the N-1 values resulting from said N-1 multipliers, constructing a phase reference, the number N-1 being said finite length, selected in order to obtain the desired accuracy in the constructed phase, said accuracy increasing as N increases.

24. A non-coherent receiver of symbol sequence ({$a_n$}), obtained by impressing M phase discrete values to a carrier transmitted on a communication channel affected by white gaussian noise, including:

a non-coherent converter base band converting a received signal, followed by a filter (FRIC) matched to a transmission pulse, followed in turn by a sampler (CAMP) sampling at symbol frequency, that obtains a sequence of complex samples {$x_n$};

a phase reconstruction memory (SHF1) where N-1 samples ($x_{n-1}, \ldots, x_{n-N+1}$) of said sequence of complex samples {$x_n$} preceding a current sample ($x_n$) are stored;

a calculator calculating transition metrics ($\lambda_n^{(s)}$) of a trellis whose branches represent possible transitions among states defined by possible subsequences of information symbols ({$c_n$}) of finite length;

a Viterbi processor adapted to select paths on the trellis such that a cumulative path metric of transition metrics is maximum, said path metric indicating the likelihood degree existing among the symbols ({$\tilde{c}_n$}) of a relevant path and transmitted information symbols ({$c_n$}), wherein said calculator of the transition metrics ($\lambda_n^{(s)}$) is subdivided into a plurality of identical sub-calculators, each calculating a relevant transition metric ($\lambda_n^{(s)}$), including:

a memory for N code symbols ($\tilde{c}_{n-1}, \ldots, \tilde{c}_{n-N+1}$) univocally associated with a relevant branch of the trellis;

a phase reference constructor controlled by said N-1 samples ($x_{n-1}, \ldots, x_{n-N+1}$) stored in said phase reconstruction memory (SHF1) and by N-1 said code symbols ($\tilde{c}_{n-1}, \ldots, \tilde{c}_{n-N+1}$) corresponding to said samplers;

a first multiplier multiplying said current sample ($x_n$) by the conjugate of a code symbol ($\tilde{c}_n$) corresponding to said current sample;

a second multiplier multiplying the value resulting from said first multiplier by the conjugate of a constructed phase reference;

an extractor extracting the real part of the value resulting from said second multiplier, obtaining the relevant transition metric ($\lambda_n^{(s)}$).

25. The non-coherent receiver according to claim 24, wherein said phase reference constructor includes:

multipliers multiplying said N-1 samples ($x_{n-1}, \ldots, x_{n-N+1}$) stored in said phase reconstruction memory (SHF1) by the complex conjugate of said corresponding N-1 code symbols ($\tilde{c}_{n-1}, \ldots, \tilde{c}_{n-N+1}$); and an adder adding the N-1 values resulting from said N-1 multipliers, and also adapted to construct a phase reference, the number N-1 being said finite length, selected in order to obtain the desired accuracy in the constructed phase reference, said accuracy increasing as N increases.

* * * * *

UNITED STATES PATENT AND TRADEMARK OFFICE
CERTIFICATE OF CORRECTION

PATENT NO.    : 6,389,079 B2
DATED         : May 14, 2002
INVENTOR(S)   : Riccardo Raheli et al.

It is certified that error appears in the above-identified patent and that said Letters Patent is hereby corrected as shown below:

<u>Title page,</u>
Item [30], Foreign Application Priority Data, please correct the date of the Italian application from "Jun. 6, 1997" to -- Jun. 3, 1997 --.

Signed and Sealed this

Fourteenth Day of January, 2003

JAMES E. ROGAN
*Director of the United States Patent and Trademark Office*